United States Patent
Luick

(10) Patent No.: US 7,730,283 B2
(45) Date of Patent: *Jun. 1, 2010

(54) SIMPLE LOAD AND STORE DISAMBIGUATION AND SCHEDULING AT PREDECODE

(75) Inventor: David A. Luick, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/174,529

(22) Filed: Jul. 16, 2008

(65) Prior Publication Data

US 2008/0276074 A1 Nov. 6, 2008

Related U.S. Application Data

(63) Continuation of application No. 11/422,647, filed on Jun. 7, 2006, now Pat. No. 7,461,238.

(51) Int. Cl.
G06F 9/30 (2006.01)
(52) U.S. Cl. ...................................... 712/216
(58) Field of Classification Search ................. 712/216, 712/217, 219
See application file for complete search history.

(56) References Cited

U.S. PATENT DOCUMENTS

| 5,625,789 | A | 4/1997 | Hesson et al. |
|---|---|---|---|
| 5,751,946 | A | 5/1998 | Afsar et al. |
| 5,809,275 | A | 9/1998 | Lesartre |
| 5,884,061 | A | 3/1999 | Hesson et al. |
| 5,903,749 | A | 5/1999 | Kenner et al. |
| 6,021,485 | A | 2/2000 | Feiste et al. |
| 6,141,747 | A | 10/2000 | Witt |
| 6,308,242 | B1 | 10/2001 | Kim |
| 6,308,260 | B1 | 10/2001 | Le et al. |
| 6,349,382 | B1 | 2/2002 | Feiste et al. |
| 6,463,514 | B1 | 10/2002 | Ray et al. |

(Continued)

FOREIGN PATENT DOCUMENTS

| EP | 0436092 A2 | 7/1991 |
|---|---|---|
| EP | 0871109 A2 | 10/1998 |
| WO | 0250668 A | 6/2002 |

OTHER PUBLICATIONS

Free On-Line Dictionary of Computing. www.foldoc.org search term: cache © 1997.*

(Continued)

*Primary Examiner*—Aimee J Li
(74) *Attorney, Agent, or Firm*—Patterson & Sheridan LLP

(57) ABSTRACT

Embodiments of the invention provide a processor for executing instructions. In one embodiment, the processor includes circuitry to receive a load instruction and a store instruction to be executed in the processor and detect a conflict between the load instruction and the store instruction. Detecting the conflict includes determining if load-store conflict information indicates that the load instruction previously conflicted with the store instruction. The load-store conflict information is stored for both the load instruction and the store instruction. The processor further includes circuitry to schedule execution of the load instruction and the store instruction so that execution of the load instruction and the store instruction do not result in a conflict.

6 Claims, 11 Drawing Sheets

U.S. PATENT DOCUMENTS

| | | |
|---|---|---|
| 6,481,251 B1 | 11/2002 | Meier et al. |
| 6,598,156 B1 | 7/2003 | Aora |
| 6,728,867 B1 | 4/2004 | Kling |
| 7,058,751 B2 | 6/2006 | Kawarai et al. |
| 7,103,880 B1 | 9/2006 | Morris et al. |
| 7,461,238 B2 | 12/2008 | Luick |
| 2005/0149703 A1 | 7/2005 | Hammond et al. |
| 2007/0288725 A1 | 12/2007 | Luick |
| 2007/0288726 A1 | 12/2007 | Luick |

OTHER PUBLICATIONS

Hirata et al., An Elementary Processor Architecture with Simultaneous Instruction Issuing from Multiple Threads, Proceedings of the 19th Annual International Symposium on Computer Architecture, 1992, pp. 136-145.

Weiss et al., Instruction Issue Logic in Pipelined Supercomputers, IEEE Transactions on Computers, vol. C-33, Issue 11, Nov. 1984, pp. 110-118.

Austin et al., Dynamic Dependency Analysis of Ordinary Programs, Proceedings of the 19th Annual International Symposium on Computer Architecture, May 19-21, 1992, pp. 342-351.

Shen et al., Modern Processor Design—Fundamentals of Superscalar Processors, Beta Edition, McGraw Hill, USA, 2003, pp. 196-201.

Mikko Herman Lipasti, Value Locality and Speculative Execution, Dissertation for Carnegie Mellon University, Apr. 1997.

Office Action dated Jan. 9, 2008 for U.S. Appl. No. 11/422,647.

\* cited by examiner

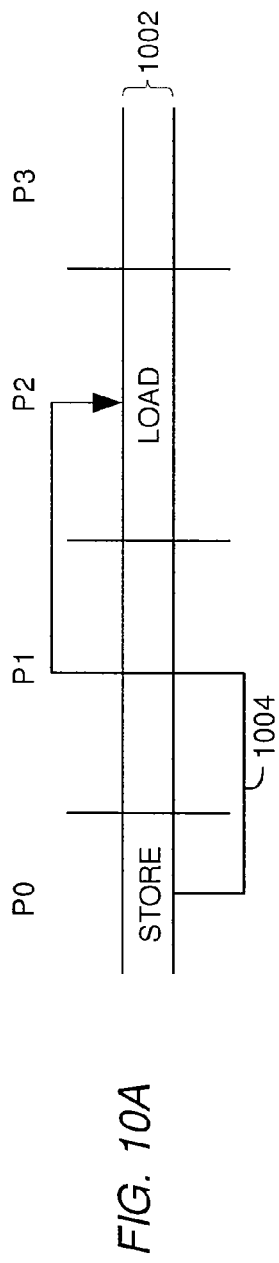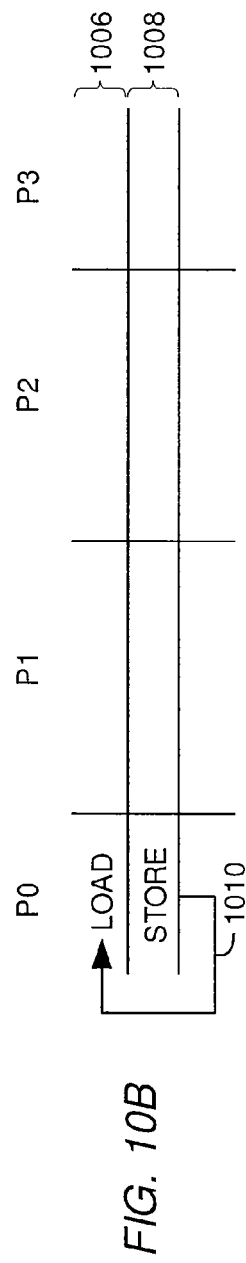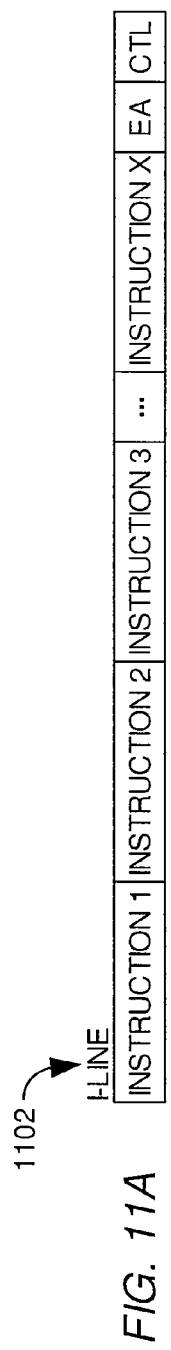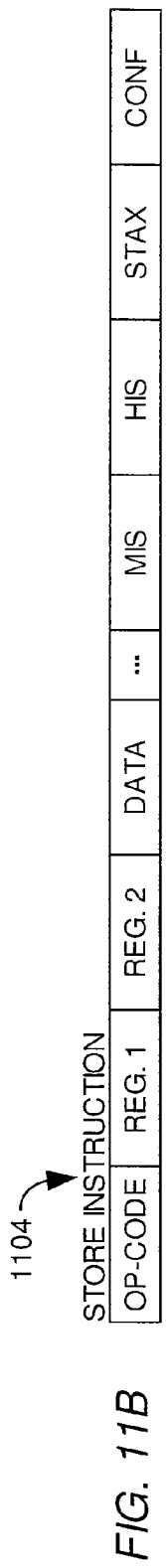
FIG. 10A
FIG. 10B
FIG. 11A
FIG. 11B

SIMPLE LOAD AND STORE DISAMBIGUATION AND SCHEDULING AT PREDECODE

CROSS-REFERENCE TO RELATED APPLICATIONS

This application is a continuation of U.S. patent application Ser. No. 11/422,647, filed Jun. 7, 2006 now U.S. Pat. No. 7,461,238, which is herein incorporated by reference in its entirety.

BACKGROUND OF THE INVENTION

1. Field of the Invention

The present invention generally relates to executing instructions in a processor. Specifically, this application is related to minimizing stalls in a processor due to store-load conflicts.

2. Description of the Related Art

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

As an example of executing instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Thus, the processor may process two or more instructions at the same time (in parallel).

To provide for faster access to data and instructions as well as better utilization of the processor, the processor may have several caches. A cache is a memory which is typically smaller than the main memory and is typically manufactured on the same die (i.e., chip) as the processor. Modern processors typically have several levels of caches. The fastest cache which is located closest to the core of the processor is referred to as the Level 1 cache (L1 cache). In addition to the L1 cache, the processor typically has a second, larger cache, referred to as the Level 2 Cache (L2 cache). In some cases, the processor may have other, additional cache levels (e.g., an L3 cache and an L4 cache).

Processors typically provide load and store instructions to access information located in the caches and/or main memory. A load instruction may include a memory address (provided directly in the instruction or using an address register) and identify a target register (Rt). When the load instruction is executed, data stored at the memory address may be retrieved (e.g., from a cache, from main memory, or from other storage means) and placed in the target register identified by Rt. Similarly, a store instruction may include a memory address and a source register (Rs). When the store instruction is executed, data from Rs may be written to the memory address. Typically, load instructions and store instructions utilize data cached in the L1 cache.

In some cases, when a store instruction is executed, the data being stored may not immediately be placed in the L1 cache. For example, after the load instruction begins execution in a pipeline, it may take several processor cycles for the load instruction to complete execution in the pipeline. As another example, the data being stored may be placed in a store queue before being written back to the L1 cache. The store queue may be used for several reasons. For example, multiple store instructions may be executed in the processor pipeline faster than the stored data is written back to the L1 cache. The store queue may hold the results for the multiple store instructions and thereby allow the slower L1 cache to later store the results of the load instructions and "catch up" with the faster processor pipeline. The time necessary to update the L1 cache with the results of the store instruction may be referred to as the "latency" of the store instruction.

Where data from a store instruction is not immediately available in the L1 cache due to latency, certain instruction combinations may result in execution errors. For example, a store instruction may be executed which stores data to a memory address. As described above, the stored data may not be immediately available in the L1 cache. If a load instruction which loads data from the same memory address is executed shortly after the store instruction, the load instruction may receive data from the L1 cache before the L1 cache is updated with the results of the store instruction.

Thus, the load instruction may receive data which is incorrect or "stale" (e.g., older data from the L1 cache which should be replaced with the results of the previously executed store instruction). Where a load instruction loads data from the same address as a previously executed store instruction, the load instruction may be referred to as a dependent load instruction (the data received by the load instruction is dependent on the data stored by the store instruction). Where a dependent load instruction receives incorrect data from a cache as a result of the latency of a store instruction, the resulting execution error may be referred to as a load-store conflict.

Because the dependent load instruction may have received incorrect data, subsequently issued instructions which use the incorrectly loaded data may also be executed improperly and reach incorrect results. To detect such an error, the memory address of the load instruction may be compared to the memory address of the store instruction. Where the memory addresses are the same, the load-store conflict may be detected. However, because the memory address of the load instruction may not be known until after the execution of the load instruction, the load-store conflict may not be detected until after the load instruction has been executed.

Thus, to resolve the detected error, the executed load instruction and the subsequently issued instructions may be flushed from the pipeline (e.g., the results of the load instruction and subsequently executed instructions may be discarded) and each of the flushed instructions may be reissued and re-executed in the pipeline. While the load instruction and subsequently issued instructions are being invalidated and reissued, the L1 cache may be updated with the data stored by the store instruction. When the reissued load instruction is executed the second time, the load instruction may then receive the correctly updated data from the L1 cache.

Executing, invalidating, and reissuing the load instruction and subsequently executed instructions after a load-store conflict may take many processor cycles. Because the initial results of the load instruction and subsequently issued instructions are invalidated, the time spent executing the instructions is essentially wasted. Thus, load-store conflicts typically result in processor inefficiency.

Accordingly, there is a need for improved methods of executing load and store instructions.

SUMMARY OF THE INVENTION

Embodiments of the invention generally provide a method and processor for executing instructions. In one embodiment, the method includes receiving a load instruction and a store instruction to be executed in the processor and detecting a conflict between the load instruction and the store instruction. Detecting the conflict includes determining if load-store conflict information indicates that the load instruction previously conflicted with the store instruction. The load-store conflict information is stored for both the load instruction and the store instruction. The method further includes scheduling execution of the load instruction and the store instruction so that execution of the load instruction and the store instruction do not result in a conflict.

One embodiment of the invention provides a processor including a cache; and circuitry. In one embodiment, the circuitry is configured to receive a load instruction and a store instruction from the cache and detect a conflict between the load instruction and the store instruction. Detecting the conflict includes determining if load-store conflict information indicates that the load instruction previously conflicted with the store instruction. The load-store conflict information is stored for both the load instruction and the store instruction. The circuitry is further configured to schedule execution of the load instruction and the store instruction so that execution of the load instruction and the store instruction do not result in a conflict.

One embodiment of the invention provides a method for scheduling execution of a load and store instruction. The method includes determining if load-store conflict information for the load and store instruction indicates that the load and store instruction may conflict and if the load-store conflict information for the load and store instruction indicates that the load and store instruction may conflict, then determining whether a portion of a load effective address for the load instruction matches a portion of a store effective address for the store instruction. If the portion of the load effective address matches the portion of the store effective address, the load and store instruction are scheduled for execution such that executing the load and store instruction does not result in a conflict.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 10A-B are diagrams depicting scheduling of load and store instructions according to embodiments of the invention.

FIG. 11A is a block diagram depicting an exemplary I-line used to store load-store conflict information according to one embodiment of the invention.

FIG. 11B is a block diagram depicting an exemplary store instruction according to one embodiment of the instruction.

DETAILED DESCRIPTION OF THE PREFERRED EMBODIMENTS

Figure 1:
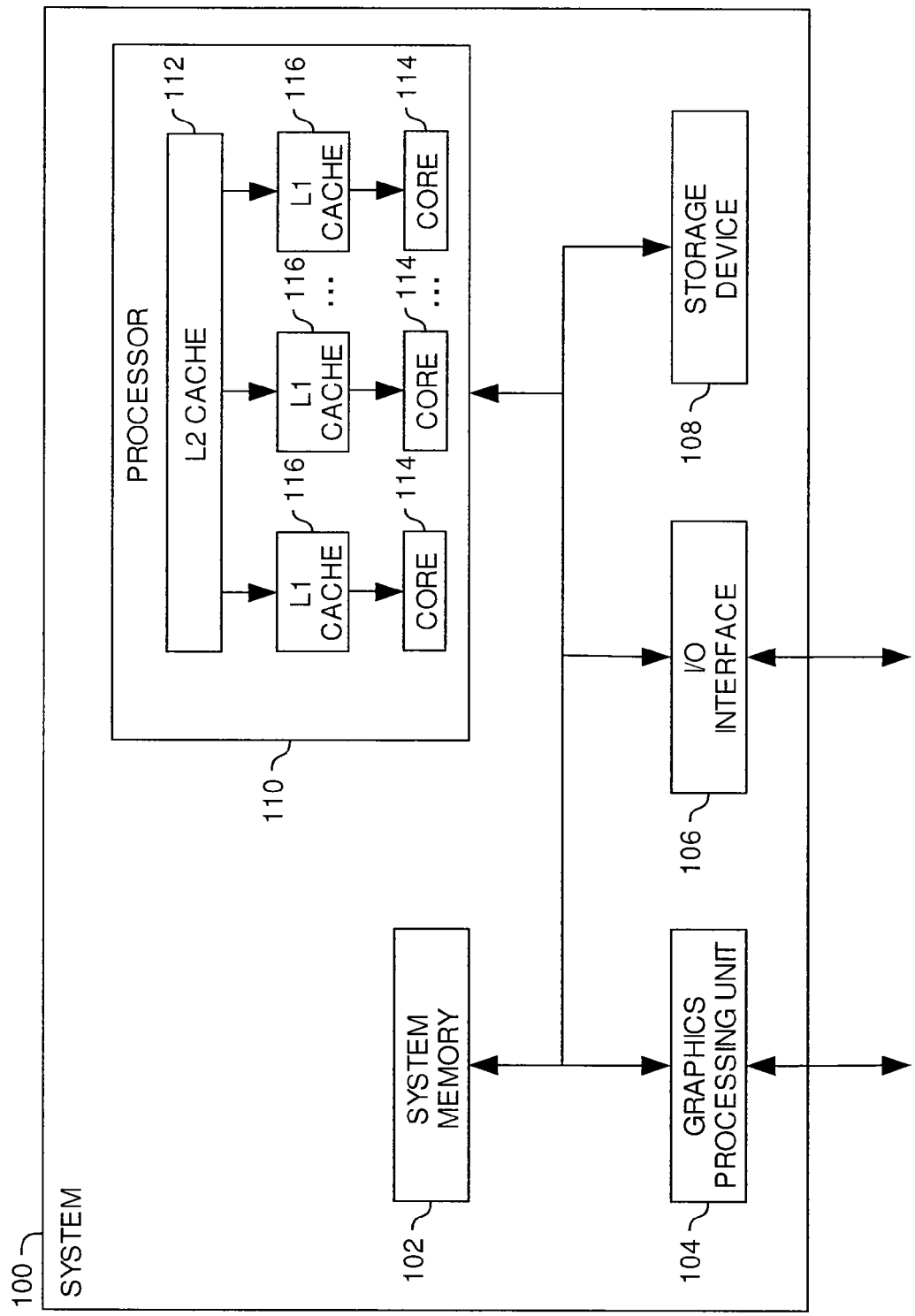
FIG. 1 is a block diagram depicting a system according to one embodiment of the invention.

Embodiments of the invention generally provide a method and processor for executing instructions. In one embodiment, the method includes receiving a load instruction and a store instruction to be executed in the processor and detecting a conflict between the load instruction and the store instruction. Detecting the conflict includes determining if load-store conflict information indicates that the load instruction previously conflicted with the store instruction. The load-store conflict information is stored for both the load instruction and the store instruction. The method further includes scheduling execution of the load instruction and the store instruction so that execution of the load instruction and the store instruction do not result in a conflict. In some cases, by storing load-store conflict information for both the load instruction and the store instruction, accuracy in determining which load instruction conflicts with which store instruction may be improved.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

While described below with respect to a processor having multiple processor cores and multiple L1 caches, wherein each processor core uses multiple pipelines to execute instructions, embodiments of the invention may be utilized with any processor which utilizes a cache, including processors which have a single processing core. In general, embodiments of the invention may be utilized with any processor and are not limited to any specific configuration. Furthermore, while described below with respect to a processor having an L1-cache divided into an L1 instruction cache (L1 I-cache, or I-cache) and an L1 data cache (L1 D-cache, or D-cache), embodiments of the invention may be utilized in configurations wherein a unified L1 cache is utilized. Also, while described below with respect to an L1 cache which utilizes an L1 cache directory, embodiments of the invention may be utilized wherein a cache directory is not used.

Overview of an Exemplary System

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
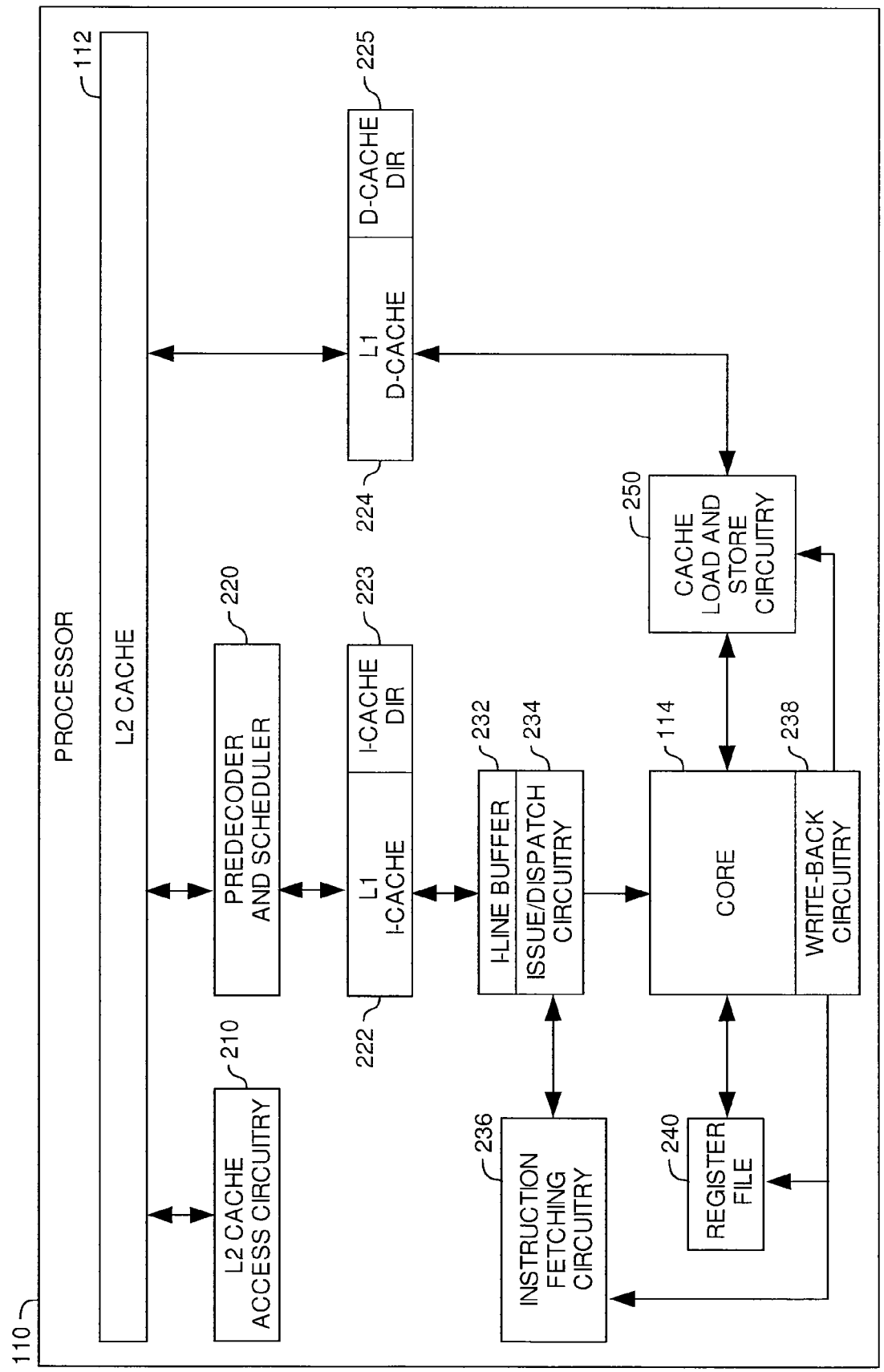
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., contain identical pipelines with identical pipeline stages). In another embodiment, each core 114 may be different (e.g., contain different pipelines with different stages).

In one embodiment of the invention, the L2 cache may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache. When the processor core 114 requests instructions from the L2 cache 112, the instructions may be first processed by a predecoder and scheduler 220 (described below in greater detail).

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using L2 access circuitry 210.

I-lines retrieved from the L2 cache 112 may be processed by a predecoder and scheduler 220 and the I-lines may be placed in the I-cache 222. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution.

In some cases, the predecoder and scheduler 220 may be shared among multiple cores 114 and L1 caches. Similarly, D-lines fetched from the L2 cache 112 may be placed in the D-cache 224. A bit in each I-line and D-line may be used to track whether a line of information in the L2 cache 112 is an I-line or D-line. Optionally, instead of fetching data from the L2 cache 112 in I-lines and/or D-lines, data may be fetched from the L2 cache 112 in other manners, e.g., by fetching smaller, larger, or variable amounts of data.

In one embodiment, the I-cache 222 and D-cache 224 may have an I-cache directory 223 and D-cache directory 225 respectively to track which I-lines and D-lines are currently in the I-cache 222 and D-cache 224. When an I-line or D-line is added to the I-cache 222 or D-cache 224, a corresponding entry may be placed in the I-cache directory 223 or D-cache directory 225. When an I-line or D-line is removed from the I-cache 222 or D-cache 224, the corresponding entry in the I-cache directory 223 or D-cache directory 225 may be removed. While described below with respect to a D-cache 224 which utilizes a D-cache directory 225, embodiments of the invention may also be utilized where a D-cache directory 225 is not utilized. In such cases, the data stored in the D-cache 224 itself may indicate what D-lines are present in the D-cache 224.

In one embodiment, instruction fetching circuitry 236 may be used to fetch instructions for the core 114. For example, the instruction fetching circuitry 236 may contain a program counter which tracks the current instructions being executed in the core. A branch unit within the core may be used to change the program counter when a branch instruction is encountered. An I-line buffer 232 may be used to store instructions fetched from the L1 I-cache 222. Issue and dispatch circuitry 234 may be used to group instructions in the I-line buffer 232 into instruction groups which may then be issued in parallel to the core 114 as described below. In some cases, the issue and dispatch circuitry may use information provided by the predecoder and scheduler 220 to form appropriate instruction groups.

In addition to receiving instructions from the issue and dispatch circuitry 234, the core 114 may receive data from a variety of locations. Where the core 114 requires data from a data register, a register file 240 may be used to obtain data. Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) before the D-cache access is completed.

In some cases, data may be modified in the core 114. Modified data may be written to the register file, or stored in memory. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, as described below, the write-back circuitry 238 may also be used to write instructions back to the I-cache 222.

As described above, the issue and dispatch circuitry 234 may be used to form instruction groups and issue the formed instruction groups to the core 114. The issue and dispatch circuitry 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Figure 3:
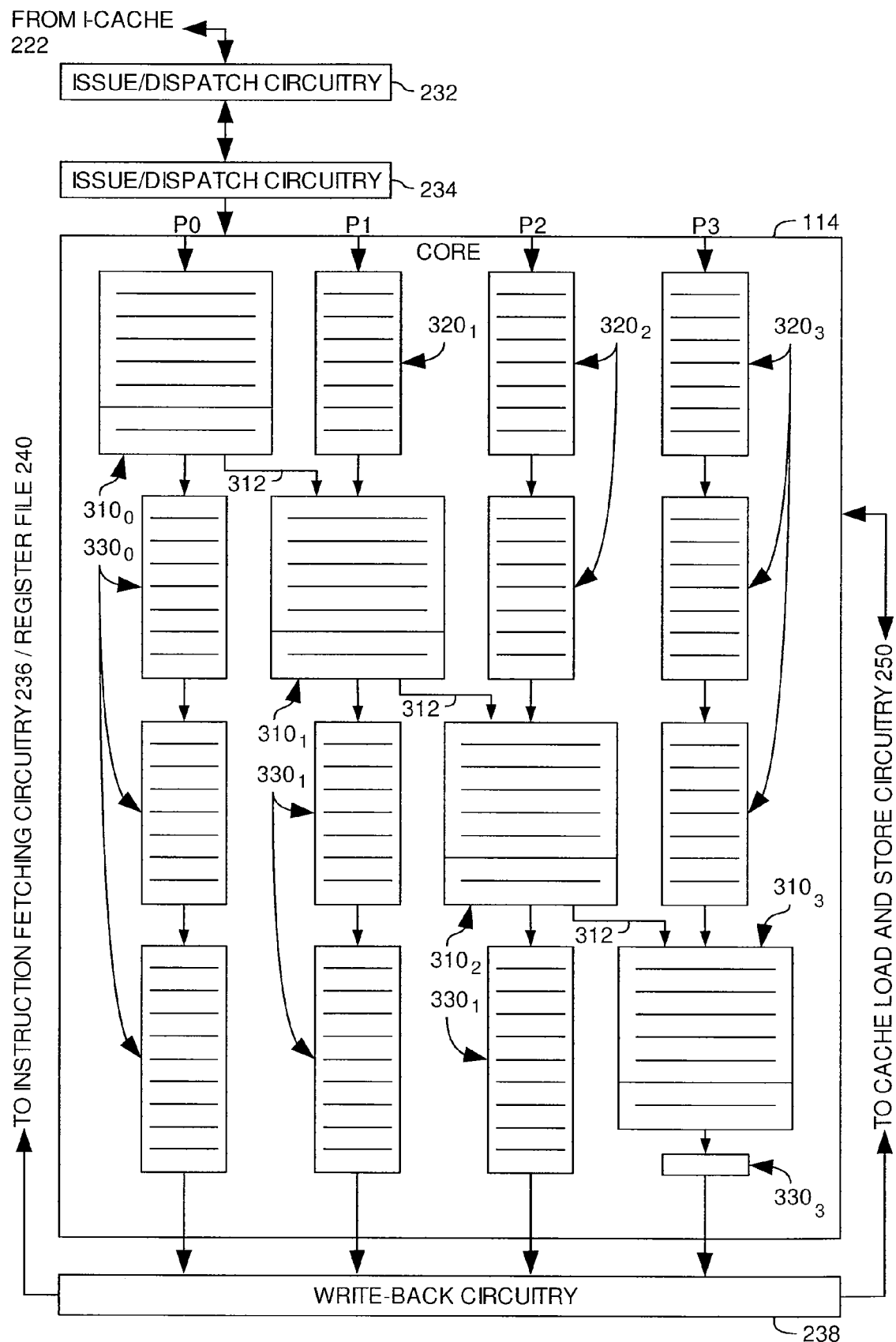
FIG. 3 is a block diagram depicting one of the cores of the processor according to one embodiment of the invention.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, P3) in the cascaded, delayed execution pipeline configuration may contain an execution unit 310. The execution unit 310 may perform one or more functions for a given pipeline. For example, the execution unit 310 may perform all or a portion of the fetching and decoding of an instruction. The decoding performed by the execution unit may be shared with a predecoder and scheduler 220 which is shared among multiple cores 114 or, optionally, which is utilized by a single core 114. The execution unit may also read data from a register file, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry, as well as any other circuitry, to perform these functions.

In one embodiment, each execution unit 310 may perform the same functions (e.g., each execution unit 310 may be able to perform load/store functions). Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. In such a configuration, where four instructions (referred to, for convenience, as I0, I1, I2, I3) in an instruction group are issued in parallel to the pipelines P0, P1, P2, P3, each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on. I0 may be executed immediately in execution unit $310_0$. Later, after instruction I0 has finished being executed in execution unit $310_0$, execution unit $310_1$ may begin executing instruction I1, and so one, such that the instructions issued in parallel to the core 114 are executed in a delayed manner with respect to each other.

In one embodiment, some execution units 310 may be delayed with respect to each other while other execution units 310 are not delayed with respect to each other. Where execution of a second instruction is dependent on the execution of a first instruction, forwarding paths 312 may be used to forward the result from the first instruction to the second instruction. The depicted forwarding paths 312 are merely exemplary, and the core 114 may contain more forwarding paths from different points in an execution unit 310 to other execution units 310 or to the same execution unit 310.

In one embodiment, instructions not being executed by an execution unit 310 may be held in a delay queue 320 or a target delay queue 330. The delay queues 320 may be used to hold instructions in an instruction group which have not been executed by an execution unit 310. For example, while instruction I0 is being executed in execution unit $310_0$, instructions I1, I2, and I3 may be held in a delay queue 330. Once the instructions have moved through the delay queues 330, the instructions may be issued to the appropriate execution unit 310 and executed. The target delay queues 330 may be used to hold the results of instructions which have already been executed by an execution unit 310. In some cases, results in the target delay queues 330 may be forwarded to executions units 310 for processing or invalidated where appropriate. Similarly, in some circumstances, instructions in the delay queue 320 may be invalidated, as described below.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 306 may be used to write back the most recently modified value of a register and discard invalidated results.

Utilizing Effective Addresses to Forward Data for Load-Store Instructions

One embodiment of the invention provides a method for resolving load-store conflicts. The method includes determining if an effective address of a load instruction in a first pipeline matches an effective address of a store instruction in a second pipeline. If the effective addresses of the store instruction and the load instruction match, data from the store instruction is speculatively forwarded to the pipeline containing the load instruction. In some cases, the forwarding may be performed after the effective address comparison is performed. Optionally, the forwarding may be performed before the effective address comparison is completed. In one embodiment, the forwarding may be performed without first translating the load or store effective addresses into real addresses (e.g., the effective addresses may be the only basis for determining whether to forward the store data to the load instruction).

If the effective address comparison indicates that the load instruction and store instruction have the same effective addresses, the data from the store instruction is merged with the data for the load instruction. Also, as described below, in some cases, before merging the store data with the load data, a portion of a real address for the store instruction data may be compared with a portion of a real address for the load instruction data. Such portions may, for example, be stored in a D-cache directory 225 along with a corresponding effective address. During execution of the load instruction, the D-cache directory 225 may be accessed while determining whether the data to be loaded is located in the D-cache 224.

After the store data is merged with the load data (assuming the address comparisons indicate a match), the data for the load instruction is then formatted and may be placed in a register. Because effective addresses (e.g., as opposed to real addresses) are used in the pipeline to determine if the load and store instruction conflict, comparison of the effective addresses for the load and store instruction may be made more quickly than in conventional pipelines (e.g., more quickly than in pipelines which require effective to real address translation to perform address comparisons). Also, by speculatively forwarding the data for the store instruction to the pipeline containing the load instruction, results of an effective to real address translation (and in some cases, effective address comparison) need not immediately be obtained to determine if a forward is necessary.

Figure 4:
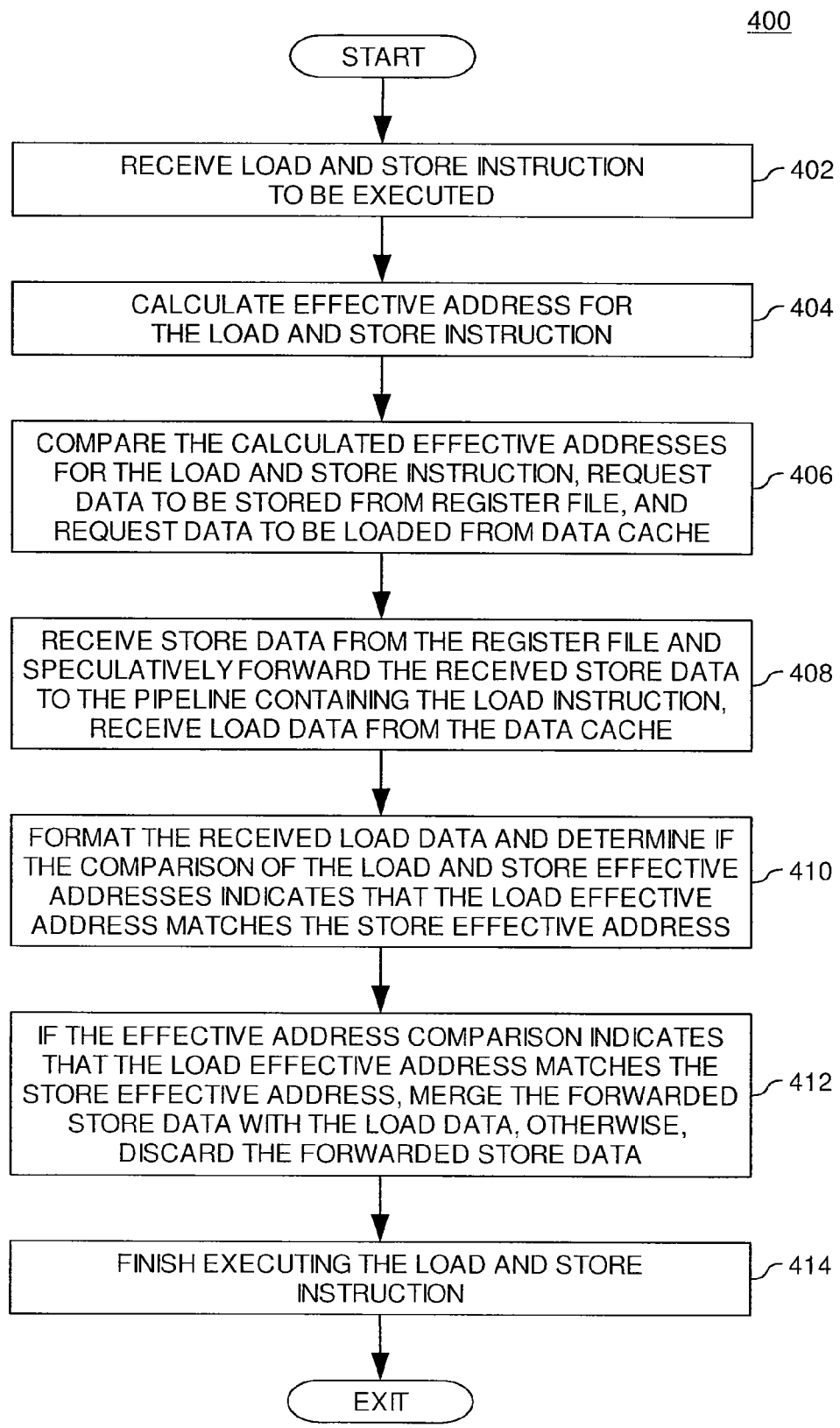
FIG. 4 is a flow diagram depicting a process for resolving load-store conflicts according to one embodiment of the invention.

FIG. 4 is a flow diagram depicting a process 400 for resolving load-store conflicts according to one embodiment of the invention. The process may begin at step 402 where a load instruction and a store instruction to be executed are received. At step 404, an effective address for the load instruction and an effective address for the store instruction may be calculated. Then, at step 406, the effective address for the load and the store instruction may be compared while a register file read for the data to be stored by the store instruction is initiated and while a request for the data to be loaded is sent to the D-cache 224. At step 408, the data to be stored may be received from the register file 240 and speculatively forwarded from the pipeline executing the store instruction to the pipeline executing the load instruction while the data to be loaded may be received from the D-cache. At step 410, the received load data may be formatted while a determination is made of whether the comparison indicates that the load effective matches the store effective address. At step 412, if the load effective address matches the store effective address, the forwarded store data may be merged with the load data. If the load effective address does not match the store effective address, the forwarded store data may be discarded and the load data received from the D-cache 224 may be used. At step 414, the load and the store instruction may finish executing.

In one embodiment of the invention, the load and the store instructions may be executed in separate pipelines. Also, in some cases, the load instruction may be executed one or more clock cycles after the store instruction. Where the load instruction is executed one or more clock cycles after the store instruction, the actions described above (e.g., comparison of the load and store effective addresses) may be performed as soon as the appropriate information (e.g., the effective addresses) has been resolved.

As described above, in one embodiment of the invention, the entire load effective address and store effective address may be compared to each other. Optionally, only a portion of the load effective address and store effective address may be compared. For example, only a high portion of bits, low portion of bits, or middle portion of bits of the address may be compared. In some cases, only a portion of the addresses may be compared such that the comparison does not require an excessive number of clock cycles to be performed, allowing the processor 110 enough time to determine whether to forward and/or merge data from the store instruction to the load instruction.

In some cases, two different effective addresses may point to the same physical address. Where two different effective addresses point to the same physical address, a comparison of the effective addresses may not accurately identify a load instruction which conflicts with a store instruction. Where such a situation arises, a portion of the effective addresses which is unambiguous (e.g., is always different for different physical addresses) may be initially compared to determine whether a load-store conflict has occurred. To complete the comparison, portions of the physical address for the load and store instruction may be compared. If both the effective address portions and the physical address portions match, a load-store conflict may exist, and data from the store instruction may be forwarded and merged with the load instruction. To obtain the portions of the physical address, the effective addresses may be used as an index to retrieve the portions of the physical addresses for the load and store instruction. In one embodiment, the portions of the physical addresses for the load and store instruction may be stored in and obtained from the D-cache directory 225. Also, physical addresses for the stored instruction may be stored in a store target queue, effective to real address translation table (ERAT), or any other suitable location, as described below.

In one embodiment of the invention, the determination of whether a load instruction conflicts with a store instruction may be made by comparing portions of the load effective address and store effective address as well as a page number for the load data and store data which indicates which page (e.g., which page in a cache) each effective address points to.

For example, the lower order bits of the effective address may uniquely identify a location within a page, and the page number may uniquely identify which page each effective address is referencing.

In one embodiment of the invention, the page numbers (PN) for each effective address may be tracked in a translation look-aside buffer (TLB) which contains entries which map effective addresses into real addresses contained in a cache (e.g., the L2 cache 112). Each time a data line is retrieved from a higher level of cache and/or memory and placed in the cache, an entry may be added to the TLB. In order to maintain the page numbers, the TLB may maintain an entry number for each entry. Each entry number may correspond to a page in the cache containing data referenced by the entry.

In some cases, an effective address utilized by the processor may not have a corresponding entry in the TLB. For example, a calculated effective address may address memory which is not contained in the cache, and thus has no corresponding TLB entry. In such cases, a page number validity bit (PNV) may be used to determine whether a valid page number exists for a given effective address. If the validity bit is set for the effective addresses utilized by the load instruction and the store instruction, then the page numbers for the load and the store instruction may be compared along with a portion of the effective addresses to determine if a conflict exists. Otherwise, if the validity bit is not set, then the page numbers may not be compared. Where the page number validity bit is not set for the load instruction, the store instruction, or both instructions, a load-store conflict may not exist because the data for either instruction may not be cached. Thus, if the load and store instruction happen to reference the same data, but the referenced data is not cached, the conflict may be resolved when the data is fetched and placed into the D-cache 224 without flushing the processor core 114 and reissuing instructions.

The page numbers for each load and store effective address may be provided in a number of manners. For example, when data is retrieved from the higher level cache (e.g., as a data line), the page number may be transmitted with the data line, allowing the page number for the data line to be determined as necessary by the processor core 114. In some cases, the page number may be stored in the D-cache directory 225 which tracks entries in the D-cache 224. The page number may also be stored in any other convenient location, such as a special cache designed for the purpose or in a store target queue. The page number validity bit may also be stored with each page number, indicating whether the page number refers to a valid TLB entry.

In one embodiment of the invention, the store data may always be forwarded to the pipeline in which the load instruction is being executed. Optionally, in some cases, the store data may only be forwarded if the effective addresses of the load and the store instruction match. In other cases, for example, where a comparison of only a portion of the effective addresses is performed and/or where a portion of the physical addresses is subsequently performed, the comparison of the portions of the effective addresses may be used to determine whether to forward the store data while the comparison of the portions of the physical addresses may be used to determine whether to merge the forwarded data with the data for the load instruction.

In one embodiment of the invention, effective address comparisons may be used to select from one of a plurality of forward paths from which data may be received. Each forward path may come one of a plurality of pipelines, and may also come from one of multiple stages in a given pipeline. The forwarding paths may also come from other circuitry, such as from the store target queue, as described below.

Where forwarding paths are provided from a plurality of pipelines, an effective address comparison may be performed between the effective address of the load instruction and the effective address of the store instructions (or between portions of the addresses), if any, in each of the plurality of pipelines. If any of the effective address comparisons indicate that the effective address of data being stored in one of the pipelines matches the effective address of data being loaded, data from the pipeline containing the store instruction with the matching effective address may be selected and forwarded to the pipeline containing the load instruction. If multiple effective addresses from multiple pipelines match the effective address of the load instruction, then store data from the most recently executed store instruction (and therefore the most current data) may be selected and forwarded to the pipeline containing the load instruction.

Where forwarding paths are provided from multiple stages of a single pipeline, effective addresses of store instructions (if any) in each of the multiple stages may be compared to the effective address of the load instruction. If any of the effective addresses of the store instructions in the pipeline stages match the effective address of the load instruction, the store data for the store instruction with the matching effective address may be forwarded from the appropriate stage of the pipeline with the store instruction to the pipeline containing the load instruction. If multiple store instructions in multiple stages of a pipeline have effective addresses which match the effective address of the store instruction, only store data from the most recently executed store instruction (and therefore the most up to date data) may be forwarded from the pipeline containing the store instruction to the pipeline containing the load instruction. In some cases, comparisons and forwarding may be provided for multiple stages of multiple pipelines as well, with a comparison being performed for each stage of each pipeline with a forwarding path.

Also, as described above, in some cases, data may be forwarded from a store target queue to the pipeline containing the load instruction. For example, when a store instruction is executed, data for the store instruction may be read from the register file 240 and an address generation may be performed for the store instruction to determine a store target address (e.g., a memory location which may be identified using an effective address) to which the store data is to be written. The store data and store target address may then be placed in the store target queue. As described below, during subsequent execution of a load instruction, a determination may be made of whether any of the queued data to be stored has an effective address which matches the load effective address for the load instruction. For each of the entries in the store target queue with effective addresses which match the effective address of the load instruction, the store data for the most recently executed instruction (and therefore most up to date store data) may be selected. If store data from more recently executed store instructions (e.g., store instructions which are still being executed in a pipeline) is not available, the store data for the most recent, matching entry in the store target queue may be forwarded from store target queue to the pipeline containing the load instruction. Also, in some cases, where only a portion of the effective addresses for a load and store instruction is used to determine whether the load and store instruction are accessing data at the same address, a portion of the physical address for the store instruction may be stored in the store target queue and used to determine if different effective addresses for the load and store instruction are being used to access data located at the same effective address.

Figure 5:
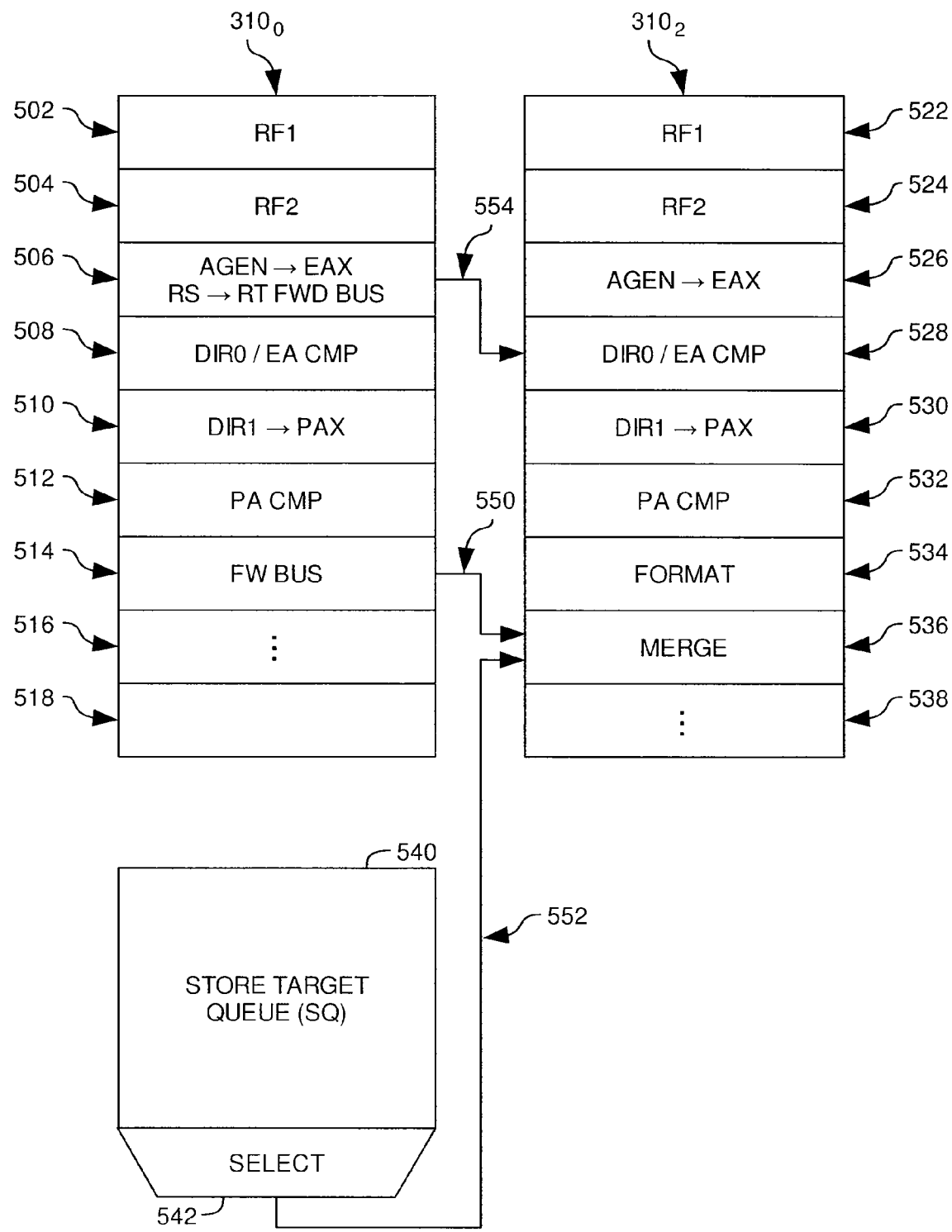
FIG. 5 depicts exemplary execution units with forwarding paths for forwarding data from a store instruction to a load instruction according to one embodiment of the invention.

FIG. 5 depicts exemplary execution units $310_0$, $310_2$ with forwarding paths 550, 552 for forwarding data from a store instruction to a load instruction according to one embodiment of the invention. In some cases, the forwarded data may come from a store instruction being executed in an execution unit 310 (referred to as a hot forward). Optionally, the forwarded data may come from a store target queue 540 which contains entries for store instructions which have completed execution in an execution unit 310 (referred to as a cold forward). The store target queue 540 may be used to hold data being stored by store instructions. The data in the store target queue 540 is typically data which is to be written back to the D-cache 224 but which cannot be immediately written back because of the limited bandwidth of the D-cache 224 in writing back data. In one embodiment, the store target queue 540 may be part of the cache load and store circuitry 250. Because store instructions being executed in an execution unit 310 provide more recently updated store data than that queued in the store target queue 540, where both the execution units 310 and the store target queue 540 contain store instructions which conflict with a load instruction, the most recently updated store data 310 may be selected and forwarded to the load instruction so that the correct data is received by the load instruction. Where the store target queue contains multiple matching entries (e.g., multiple store instructions which may conflict with the load instruction), selection circuitry 542 may be used to select an appropriate entry from the queue 540 to be forwarded as the load instruction data.

As depicted, the forwarding paths 550, 552, 554 may provide for forwarding from a store target queue 540 to a stage 536 of the execution unit $310_2$ or from one stage 514 of an execution unit $310_0$ to another stage 536 of another execution unit $310_2$. However, it is noted that the forwarding paths depicted in FIG. 5 are exemplary forwarding paths. In some cases, more forwarding paths or fewer forwarding paths may be provided. Forwarding paths may be provided for other stages of each execution unit and also from a given execution unit $310_0$, $310_2$ back to the same execution unit $310_0$, $310_2$, respectively. Execution of store and load instructions in the execution units $310_0$, $310_2$, respectively, is described below with respect to each of the stages in the execution units $310_0$, $310_2$.

Execution of each instruction in the execution units $310_0$, $310_2$ may begin with two initial stages 502, 504, 522, 524 (referred to as RF1 and RF2) in which the register file 240 is accessed, e.g., to obtain data and/or addresses used for execution of the load and store instructions. Then, in the third stage 506, 526 of each execution unit $310_0$, $310_2$, an address generation stage (AGEN) may be used to generate an effective address (EAX) for each of the instructions.

In some cases, as depicted, a forwarding path 554 may be provided which forwards a source register (RS) value for a store instruction (e.g., the source of the data being stored) to a target register (RT) value for a load instruction (e.g., the target of the data being loaded). Such a forward may be speculative e.g., the forwarded data may not actually be used by the load instruction. The forwarded data may be used, for example, if a determination is made that the effective address of the store instruction matches the effective address of the load instruction. Also, as described below, other address comparisons may be utilized, and whether the data can be forwarded may depend upon the alignment of the data being stored and the data being loaded.

In the fourth stage 508, 528 of each of the execution units $310_0$, $310_2$, an access to the D-cache directory 225 (DIR0) may be initiated in order to determine whether the data being accessed (e.g., by the load and store instruction) is in the D-cache 224. In some cases, as described above, by accessing the D-cache directory 225, bits of the physical address may be obtained for use in determining whether the load instruction and the store instruction are accessing the same data. Also during the fourth stage, a comparison of the effective addresses (or a portion of the effective address) may be performed. As described above, comparison of the effective addresses may, in some cases, be utilized to determine which forwarding path (e.g., 550, 552) should be used for forwarding data.

In the fifth stage 510, 530, physical address bits for the load and the store addresses may be received from the D-cache directory 225 (DIR1→PAX). Then, in the sixth stage 512, 532, a comparison of the received physical address bits may be performed (PA CMP). In the sixth stage of the store execution unit $310_0$, the data for the store instruction may be speculatively forwarded to the load execution unit $310_2$ via forwarding path 550 or from the store target queue 540 via forwarding path 552. The forwarding path 550 may be used to forward the store data to the load instruction after a determination has been made that the load effective address and store effective address match. Optionally, as described above, the forwarded data may be received from an earlier forward via another forwarding path 554 and the address comparison may be subsequently performed before determining whether to merge the forwarded data. The selection of the appropriate forwarding path 550, 552 may be made based on the outcome of the effective address comparisons, for example, between the load and store instructions in the execution units $310_0$, $310_2$ and between the effective addresses of data in the store target queue 540. As previously mentioned, selection circuitry 542 may be used to determine if the load effective address matches the effective address of any of the data in the store target queue 540. Also, in the sixth stage 534 of the store execution unit $310_2$, formatting of the data being loaded (e.g., the data received from the D-cache 224) may be performed.

In the sixth stage of the execution unit $310_2$ for the load instruction, merge operations may be performed. If the effective address and physical address comparisons indicate that the load and store instruction are accessing the same data, the speculatively forwarded data from the execution unit $310_0$ processing the store instruction may be merged and used as the data being loaded. Optionally, if the effective address and physical address comparisons indicate that the load and store instruction are accessing different data, the speculatively forwarded data may be discarded and load data received from the D-cache 224 may be used for the load instruction data. As depicted, other stages 516, 518, 538 may also be provided for performing operations for completing execution of the load and store instructions.

Figure 6:
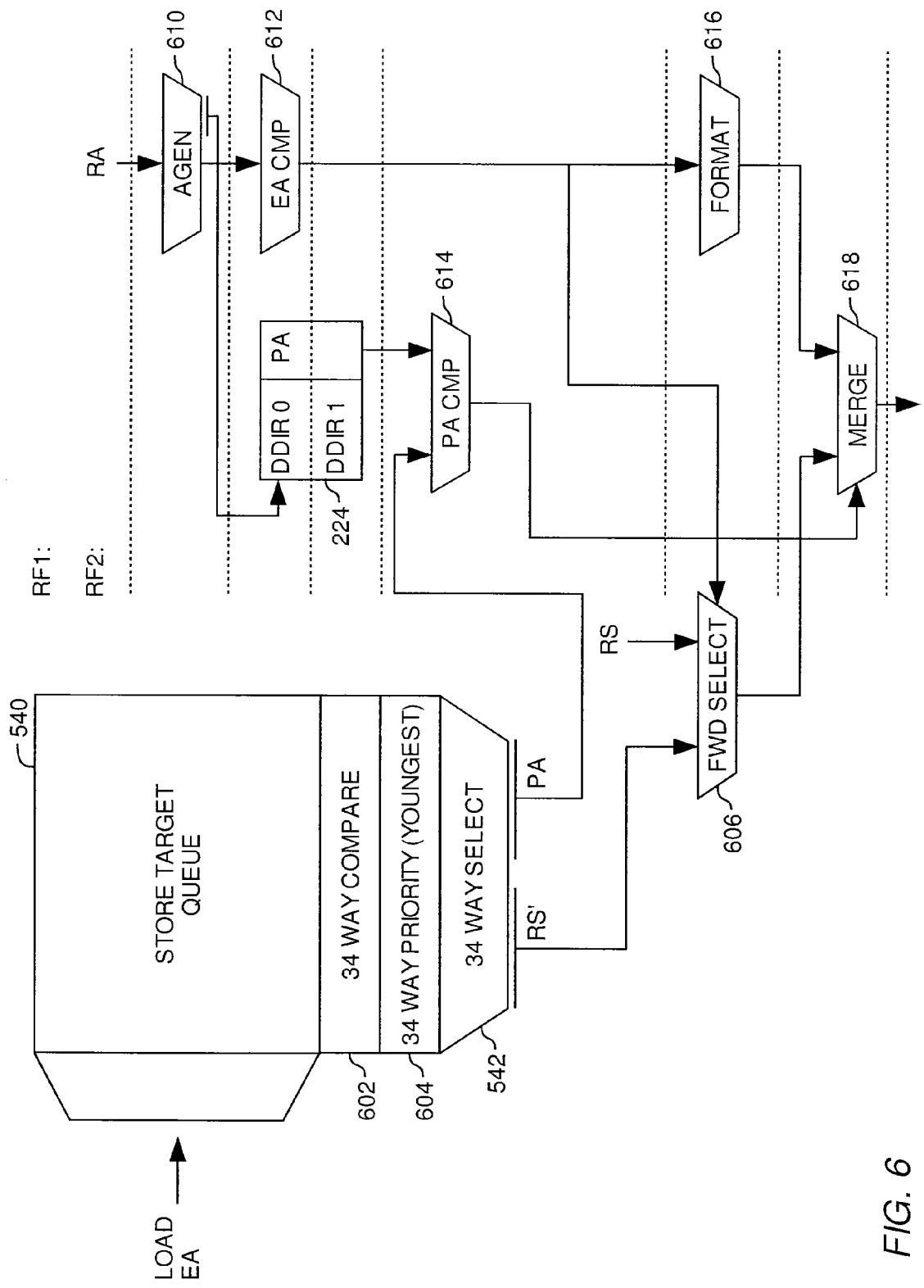
FIG. 6 is a block diagram depicting hardware which may be utilized for resolving load-store conflicts in a processor according to one embodiment of the invention.

FIG. 6 is a block diagram depicting hardware which may be utilized for resolving load-store conflicts in a processor core 114 according to one embodiment of the invention. As depicted, the hardware may include address generation (AGEN) circuitry 610. The AGEN circuitry 610 may generate an effective address for a load instruction which is compared to an effective address for a store instruction with effective address comparison circuitry (EA CMP) 612. The comparison of the effective addresses may be used to determine how load data is formatted and merged and also which store data (e.g., from a store instruction in an execution unit 310 or from the store target queue 540) is forwarded to the load instruction. Formatting may be performed by the formatting circuitry 616, and selection of the forwarded data may be performed using the forward selection circuitry (FWD Select) 606 based on the results of the effective address comparison. Also, as depicted, physical address comparison circuitry may be used to compare physical address bits (e.g., from the load instruction, store instruction being executing in an execution unit 310, and/or entries in the store target queue 540) and determine whether to merge data from a load instruction with data from a store instruction using the merge circuitry 618.

As described above, in determining whether to forward data from a store instruction to a load instruction, a determination may be made of whether an entry in the store target queue 540 has an effective address and/or physical address which matches the effective address and/or physical address of the load instruction. If the addresses of an entry in the store target queue 540 and the load instruction match, and if no other conflicting store instructions have been executed since the entry was placed in the store target queue 540 (e.g., if no other conflicting store instructions are still being executed in the execution units 310), the store target queue 540 may contain the most recently updated data for the matching address.

If multiple addresses in the store target queue 540 match the load address, a determination may be made of the most recently updated entry (e.g., the entry containing the newest data for the matching effective address) in the store target queue 540. For example, for each forwardable entry in the store target queue 540, the effective address of the entry may be compared to the load effective address. If there are, for example, 34 entries in the store target queue 540, circuitry 602 for a 34 way comparison may be utilized.

For each of the possible matching entries, a determination may then be made of which entry is the youngest, and thus contains the most recently updated store data. The determination of the youngest entry may be made, for example, using circuitry 604 which determines 34 way priority. In some cases, data stored in the store target queue 540 (e.g., a timestamp) may be utilized to determine which matching entry in the store target queue 540 is the youngest. Selection circuitry 542 may then select the youngest, matching entry in the store target queue 540 and provide the entry to the FWD select circuitry 606, which may, as described above, select between data forwarded from the store target queue 540 and an execution unit 310.

The selection circuitry 542 may also provide bits of the physical address or a page number for use in determining whether physical addresses (or a portion thereof) of the load and store instruction match. In some cases, where a page number is utilized, a bit may be provided which indicates whether the page number is valid (e.g., whether the data referenced by an effective address is actually located in a page in memory). If the page number is not valid, the page number may not be utilized for comparison of the load and store addresses, for example, because the data being stored may not be presently cached (e.g., a store miss may occur, in which case a forward may not be required).

Figure 7:
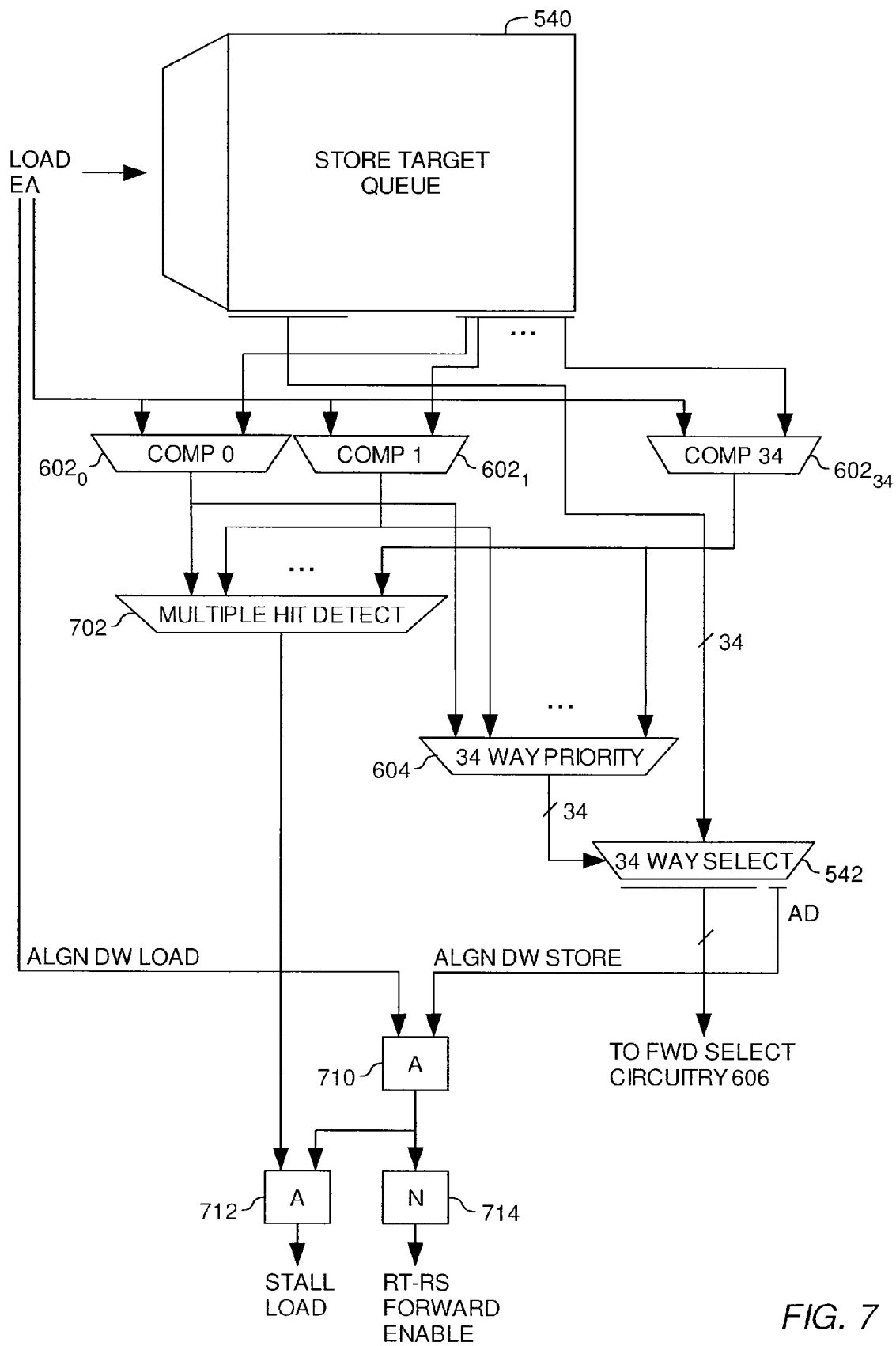
FIG. 7 is a block diagram depicting selection hardware for determining the youngest, matching entry for a load instruction address in a store target queue according to one embodiment of the invention.

FIG. 7 is a block diagram depicting selection hardware for determining the youngest, matching entry for a load instruction address in the store target queue 540 according to one embodiment of the invention. The selection hardware may include multiple comparison circuits $602_0, 602_1, \ldots 602_{34}$ for comparing the effective addresses of entries in the store target queue 540 with the load effective address (load EA). Also, as describe above, the selection hardware may contain priority circuitry 604 and selection circuitry 542.

In some cases, depending on the capabilities of the processor being used, the selection hardware may also provide control signals which indicate whether a forward of data from a store instruction to a load instruction may be performed. For example, if multiple, unaligned load-store conflict hits are detected (determined using multiple hit detect circuitry 702, AND gate 710 and AND gate 712). Also, if an unaligned load-store combination is not detected, forwarding from a store register target to a load register source may be enabled (RT-RS forward enable, determined using AND gate 710 and NOT gate 714).

Figure 8:
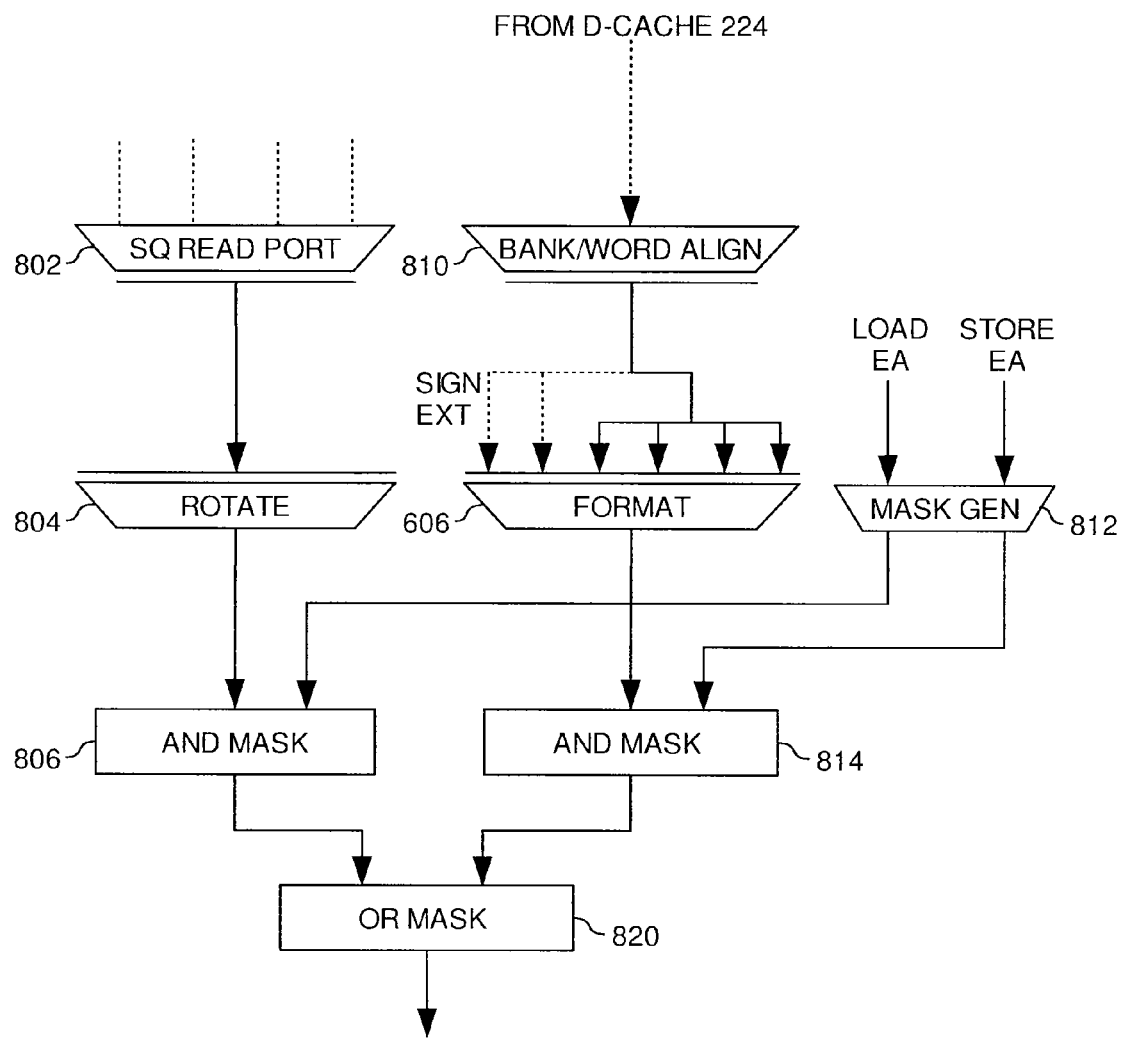
FIG. 8 is a block diagram depicting merging hardware for merging data forwarded from a store instruction with data for a load instruction according to one embodiment of the invention.

FIG. 8 is a block diagram depicting merging hardware for merging data forwarded from a store instruction with data for a load instruction according to one embodiment of the invention. As depicted, data from the D-cache 224 may be passed through bank/word align circuitry 810 which aligns the bank and word data accordingly. The aligned data may then be formatted (which may include extending the sign of the data) using format circuitry 606. With respect to data received, for example, from the store target queue read port 802, the data may be rotated, if necessary, in preparation for combining the received data with the data for the load instruction.

To combine the load and store data, masks may be generated by mask generation circuitry 812 and combined with the formatted load data and the store data using AND mask circuitry 806, 814. The masks may, for example, block parts of the load and/or store data which are not needed by the load instruction. For example, if only a portion of the load data is being combined with only a portion of the store data, the generated masks may block the unused portions of the load and store data while the remainder of the load and store data is combined. In one embodiment, the load and store data may be combined with OR circuitry 820. In general, the merge circuitry 618 may be configured to completely replace load data with store data, replace higher order bits of load data with store data, replace lower order bits of load data with store data, and/or replace bits in the center of the load data with store data.

In some cases, a complete comparison of the physical address bits and effective address bits may not be performed immediately by the processor 110, for example, while the load and store instruction are still being executed. Thus, as some point after the load and store instruction have been executed, a validation step may be performed in order to fully determine if the load and store instruction actually conflict with each other. The validation step may include accessing a translation look-aside buffer (TLB) to determine the full physical address for the load and store data. If the validation step indicates that the load and store instruction are not actually accessing the same data, the effects of the load and store instruction may be reversed (e.g., by flushing data from the store target queue 540, from the target delay queues 330, or from other areas affected by the instructions) and subsequently executed instructions may be flushed from the processor core 114 so that the load and store instructions may be reissued and correctly executed by the processor core 114.

Using Load-Store Conflict Information to Schedule the Execution of Load and Store Instructions In some cases, forwarding may not be possible between a load and store instruction. For example, the design of the processor core 114 may not devote resources for forwarding paths which cover all possible situations where forwarding may be required or execution considerations (e.g., maintaining the consistency of data being processed by the core 114) may prohibit forwarding in some cases. In other cases, forwarding may be provided, but as described above, the number of conflicting store instructions and/or the alignment of the load and store data may prevent effective forwarding of data from the store instruction to the load instruction. Where forwarding is not utilized, the processor 110 may stall execution or even flush the instructions being executed in the core 114 in order to properly execution the conflicting load and store instruction. Where load-store conflicts result in stalling or re-execution of instructions, processor efficiency may suffer as described above.

In one embodiment of the invention, load-store conflicts may be detected and one or bits may be stored which indicate a load instruction which conflicts with a store instruction. Information indicating a load instruction and a store instruction which may possibly conflict may be referred to as load-store conflict information. When the load and the store instruction are scheduled to be executed, if the load-store conflict information indicates that the load and the store instruction may possibly conflict (e.g., based on a conflict in the past), the execution of the load instruction may be scheduled in such a manner that a conflict does not arise. For example, the load instruction may be executed such that forwarding from the load instruction to the store instruction may be utilized, for example, using embodiments described above or any other forwarding embodiments known to those skilled in the art. Optionally, execution of the load instruction may be delayed with respect to execution of the store instruction (as described below in greater detail) such that a conflict does not arise and so that forwarding of data from the store instruction to the load instruction is not utilized.

Figure 9:
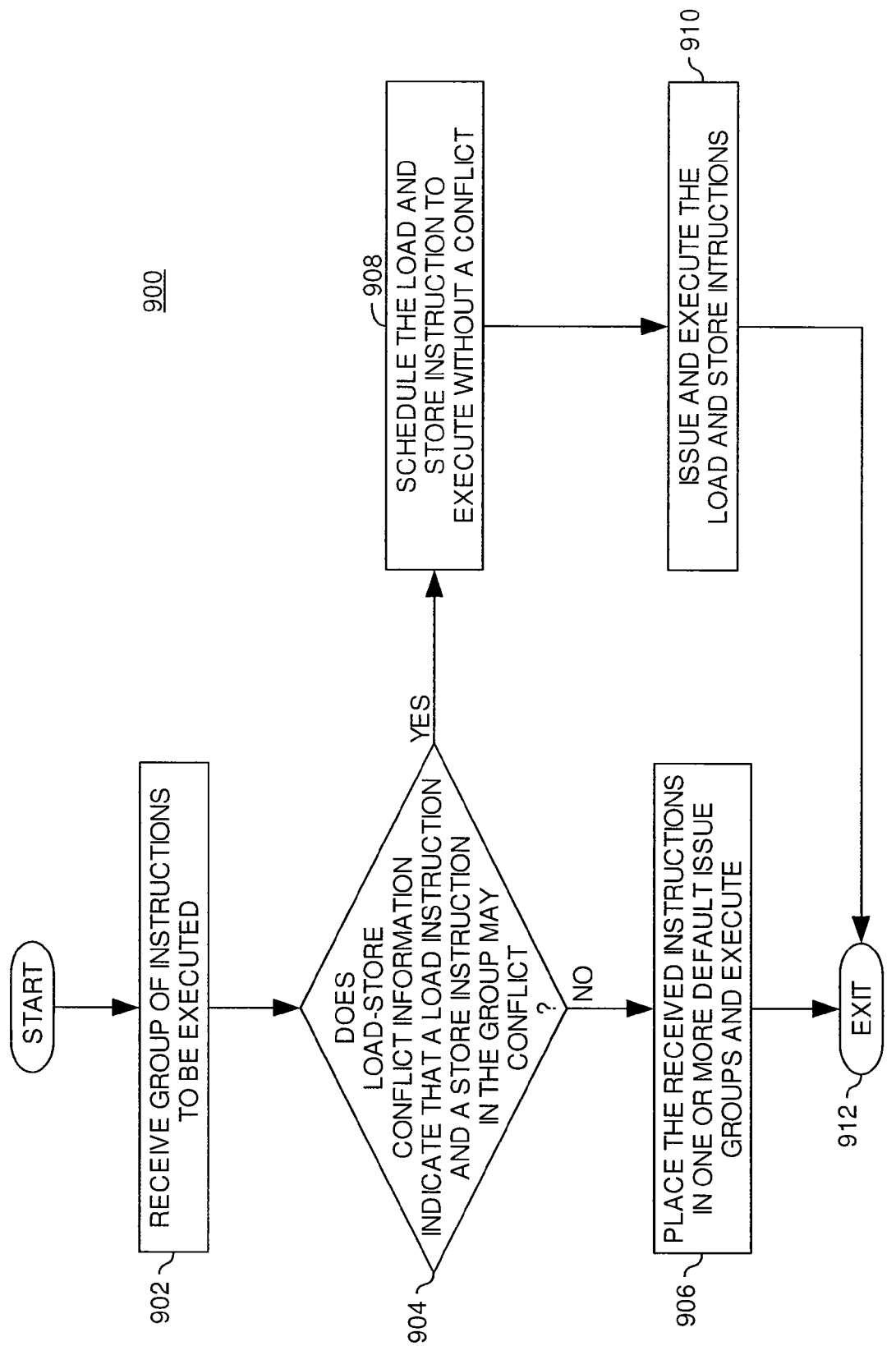
FIG. 9 is a flow diagram depicting a process for scheduling the execution of load and store instructions according to one embodiment of the invention.

FIG. 9 is a flow diagram depicting a process 900 for scheduling the execution of load and store instructions according to one embodiment of the invention. As depicted, the process 900 may begin at step 902 where a group of instructions to be executed is received. At step 904 a determination may be made of whether load-store conflict information (described in greater detail below) indicates that a load instruction and a store instruction in the instruction group may conflict.

If the load-store conflict information does not indicate that the load and store instruction will result in a conflict (e.g., there was no conflict in the past), then the instructions may be placed into default issue groups and executed by the processor at step 906. However, if the load-store conflict information indicates that the load instruction and the store instruction may conflict, then at step 908 the load and store instruction may be scheduled for execution such that the load instruction and store instruction do not result in a conflict. Then, at step 910, the load and store instruction may be issued and executed. The process 900 may finish at step 912.

In one embodiment of the invention, a predicted conflict between the load and store instruction (e.g., based on the load-store conflict information) may be resolved by delaying execution of the load instruction with respect to the execution of the store instruction. By delaying execution of the load instruction, the results of the store instruction may either be successfully forwarded to the load instruction (e.g., via a forwarding path or from a store target queue 540) or the results of the store instruction may be used to update the D-cache 224 allowing the load instruction to successfully load the updated, requested data from the D-cache 224.

In one embodiment of the invention, execution of the load instruction may be delayed with respect to execution of the store instruction by stalling execution of the load instruction. For example, when the load-store conflict information indicates that a load instruction may conflict with a store instruction, then the load instruction may be stalled while execution of the store instruction is completed. Optionally, in some cases, one or more instructions may be executed between the load and store instruction, thereby increasing processor utilization while effectively preventing improper execution of the load instruction. In some cases, the instructions executed between the load and store instruction may be instructions which are executed out of order (e.g., out of the order in which they appear in a program).

In some cases, the manner in which the load and store instruction are issued to a cascaded, delayed execution pipeline unit may be utilized to allow for proper execution of the load and store instructions. For example, where load-store conflict information indicates that a load and store instruction may conflict, the load and store instruction may be issued in a common issue group to the cascaded, delayed execution pipeline unit in a manner that resolves the conflict by delaying the execution of one instruction relative to the other.

FIG. 10A is a diagram depicting scheduling of load and store instructions in a common issue group 1002 according to one embodiment of the invention. As depicted, the load and the store instruction may be placed in the common issue group 1002 and issued simultaneously to separate pipelines (e.g., P0 and P2) in the processor core 114. The store instruction may be issued to a pipeline (P0) in which execution is not delayed (or less delayed) with respect to the pipeline (P2) to which the load instruction is executed. By placing the load instruction in a delayed execution pipeline, the execution of the load instruction may be delayed as described above. For example, the delay in execution of the load instruction may allow the results of the store instruction to be forwarded to the load instruction (via forwarding path 1004) and thereby avoid improper execution of the load instruction. Because the load instruction may be held in a delay queue $320_2$ while the store instruction is being executed, the execution unit $310_2$ for the pipeline P2 to which the load instruction is issued may still be utilized to execute other, previously issued instructions, thereby increasing overall efficiency of the processor 110.

In some cases, where load-store conflict information indicates that a load instruction conflicts with a store instruction, the load instruction and the store instruction may be issued to the same pipeline in order to prevent improper execution of the instructions. FIG. 10B is a diagram depicting scheduling of load and store instructions to the same pipeline (e.g., P0) according to one embodiment of the invention. As depicted, the load and store instructions may be issued in separate issue groups 1006, 1008 to the same pipeline (P0). By issuing the load and the store instruction to the same pipeline, execution of the load instruction may be delayed with respect to execution of the store instruction. By delaying execution of the load instruction, data from the store instruction may, for example, be forwarded from the store instruction to the load instruction (e.g., via forwarding path 1010). The load and store instructions may also be scheduled to other pipelines (e.g., P1, P2, or P3), or optionally, to different pipelines which have an equal amount of delay (e.g., if another pipeline P4 has a delay equal to the delay of pipeline P0, the load instruction or the store instruction may be scheduled for execution in order in either pipeline P0 or P4).

In some cases, to schedule execution of load and store instructions as described above, the issue groups in which load and store instructions would otherwise be placed (e.g., a default issue group) may be modified. For example, an issue group may generally contain a single instruction issued to each pipeline (e.g., four instructions issued to P0, P1, P2, P3, respectively). However, to issue the load and store instructions as described above (for example, in a common issue group or to the same pipeline in separate issue groups), some issue groups may be created in which less than 4 instructions are issued.

In some cases, different execution units 310 may provide different functionality. For example, execution units $310_0$ and $310_2$ may provide load/store functionality (and thus be used to execute load and store instructions) while execution units $310_1$ and $310_3$ may provide arithmetic and logical capabilities (and thus be used to execute arithmetic and logical instructions). Thus, when the load-store conflict information indicates that a load and store instruction may conflict, the scheduling options (described above) may be utilized in conjunction with the functionality constraints in order to properly schedule execution of the load and store instruction. For example, as depicted in FIG. 10A, the store instruction may be issued in a common issue group with the load instruction, and within the issue group the store instruction may be issued to pipeline P0 and the load instruction may be issued to pipeline P2, thereby satisfying the scheduling requirements as well as the functionality constraints. Optionally, in some cases, each of the pipelines P0, P1, P2, P3 in the processor core 114 may provide the functionality necessary to execute a load or store instruction, as well as other instructions.

In one embodiment of the invention, a single load-store execution unit 310 may be provided in the processor core 114 with no other execution units in the core 114 providing store capabilities. Two, three, or more execution units or each of the execution units in the processor core 114 may provide load capabilities. Where a single load-store execution unit 310 is provided, other execution units with load capabilities may receive forwarded store information from the single load-store execution unit 310 according to embodiments described above (e.g., using effective address comparisons).

In one embodiment, a single load-store execution unit 310 may be provided in the core 114 such that no load-store forwarding is provided between the single load-store execution unit 310 and other execution units. Where a single load-store execution unit 310 is provided, all detected load-store conflicts (e.g., load-store conflicts detected during execution or detected during predecode) may be issued to the single load-store execution unit 310. In order to schedule all detected load-store conflicts to the single load-store execution unit 310, some issue groups may be split into multiple groups to facilitate the necessary scheduling. In one embodiment, the single load-store execution unit 310 may provide a double-wide store option (e.g., such that two double words may be stored at once, or a single quad word). The double-wide load-store execution unit 310 may be used, for example, to perform save/restore functionality for the register file 240.

Load-Store Conflict Information Embodiments

As described above, if a load-store conflict is detected (e.g., during execution of a load and store instruction), load-store conflict information may be stored which indicates the conflict. In one embodiment of the invention, the load-store conflict information may include a single bit (LSC) indicating the conflict. If the bit is set, a conflict may be predicted, whereas if the bit is not set, a conflict may not be predicted.

In some cases, if a load instruction and store instruction are executed later and the instructions do not result in a conflict, LSC may be cleared to a 0, indicating that the instructions may not subsequently result in a conflict. Optionally, LSC may remain set to 1, thereby indicating that executing the instructions may possibly result in another load-store conflict.

In one embodiment of the invention, multiple history bits (HIS) may be used to predict whether a load instruction and store instruction will result in a conflict and determine how the instructions should be scheduled for execution. For instance, if HIS is two binary bits, 00 may correspond to no prediction of a load-store conflict, whereas 01, 10, and 11 may correspond to weak, strong, and very strong predictions of load-store conflicts, respectively. Each time a load and store instruction result in a load-store conflict, HIS may be incremented, increasing the prediction level for a load-store conflict. When HIS is 11 and a subsequent load-store conflict is detected, HIS may remain at 11 (e.g., the counter may saturate at 11 instead of looping to 00). Each time a load instruction does not result in a load-store conflict, HIS may be decremented. In some cases, where multiple history bits are utilized, the multiple history bits may be used both to determine which target address should be stored (as described above), and also to determine how to schedule the load instruction.

In some cases, the LSC bit(s) may be stored in an entry in a special cache. The entry may indicate a load instruction which conflicts with a store instruction. If the entry indicates that the load instruction conflicts with a store instruction, the processor 110 may schedule execution of the load instruction and a preceding store instruction (e.g., the first store instruction immediately preceding the load instruction) accordingly as described above. Optionally, the entry in the special cached may indicate a store instruction that conflicts with a succeeding load instruction. In such a case, the processor 110 may schedule execution of the store instruction and the succeeding load instruction (e.g., the first load instruction after the store instruction) accordingly as described above.

According to one embodiment of the invention, the LSC bit may be stored in the load instruction and/or store instruction. For example, when if a load-store conflict is detected, the LSC bit may be re-encoded into the load and/or store instruction (re-encoding and storage is described below in greater detail). Where the LSC bit is re-encoded into the load instruction, the load instruction and a preceding store instruction may be scheduled accordingly. Where the LSC bit is re-encoded into the store instruction, the store instruction and a succeeding load instruction may be scheduled accordingly.

Load-Store Disambiguation and Scheduling at Predecode

In some cases, the load-store conflict information may not unambiguously identify which load instruction conflicts with which store instruction. For example, due to the number of stages in each processor pipeline and/or due to the number of pipelines, the processor core 114 may execute multiple load instructions and multiple store instructions simultaneously, each of which may conflict with one another. Storing a single bit (e.g., in a load or store instruction), in some cases, may not identify which load instruction specifically conflicts with which store instruction. Also, in some cases, the address data provided for the load and store instruction (e.g., pointer information) may not be useful in determining if the load and store instruction conflict (e.g., because the pointers may not have been resolved at scheduling time). Accordingly, in some cases, the processor 114 may store additional information which may be utilized for disambiguation (e.g., more particular identification) of the load instruction and store instruction which conflict.

In some cases, the disambiguation information may be generated during scheduling and predecoding of the instructions. Also, in some cases, the disambiguation information may be generated during a previous execution of the instructions (e.g., during a training phase, as described below). The information may be used during scheduling and predecoding of the instructions (e.g., when the instructions are fetched from the L2 cache 112 and processed by the scheduler and predecoder 220) to determine which load and store instructions conflict and scheduled the instructions for executions appropriately. Optionally, other circuitry may utilize the disambiguation information for scheduling execution of the instructions.

In one embodiment of the invention, a copy of the LSC bit may be stored in both the load and store instruction (or, where a cache is utilized, entries may be provided for both the load and store instruction). Accordingly, when a store instruction with a set LSC bit is encountered, the processor 110 may determine if a succeeding load instruction also has an LSC bit which is set. If both a load and a store instruction with a set LSC bit are detected, the load and the store instruction may be scheduled for execution as described above. Any interceding load or store instructions (e.g., load or store instructions between the load and store instructions with set LSC bits) without set LSC bits may be ignored for conflict purposes, for example, because the cleared LSC bit may indicate that a conflict is not predicted between the interceding load and store instructions.

In some cases, where a store instruction is detected with a set LSC bit, the processor 110 may only look at a set number of succeeding instructions to determine if one is a load instruction which contains a set LSC bit. For example, after examining the set number of instructions for the set LSC bit, a determination may be made that any subsequently executed load instruction may not conflict with the store instruction because of the inherent delay (e.g., provided by any interceding instructions) between execution of the store and load instruction.

In one embodiment of the invention, extra load-store conflict information may be stored (e.g., in a field in a store instruction) which may be used for disambiguation purposes. For example, a portion of the store effective address (STAX, e.g., five bits of the location of the data which is being stored) may be saved (e.g., by re-encoding the portion of the store effective address in the store instruction, appending the portion of the store effective address to an I-line containing the store instructions, and/or storing the portion in a special cache). Similar information may also be provided with or encoded into load instructions.

During scheduling, if the LSC bit in a load instruction and/or store instruction indicates that a load-store conflict may exist, the saved portion of the store effective address STAX may be compared with the portion of the load effective address for each of the load instructions being scheduled at that time (e.g., the comparison may be performed between all load and store instructions being scheduled, or optionally, only between load and/or store instructions with set LSC bits). If the store effective address portion STAX of the store instruction matches the load effective address portion of a given load instruction, then a conflict may exist between the load and store instruction and the load and store instruction may be scheduled accordingly as described above.

In some cases, the load effective address and/or store effective address for the load and store instruction may change frequently (e.g., each time the instruction is executed). In such cases, the saved portion of the store effective address and the portion of the load effective address may not accurately be relied on for disambiguation purposes. In such a case, and additional bit (e.g., a confirmation bit) may be stored which indicates whether the store effective address and the load effective address is predictable. In some cases, the confirmation information may be utilized instead of (e.g., as an alternative to) history information (HIS) described above.

For example, if, during a first execution of the load and store instruction, the load effective address and the store effective address match, then the portions of the effective addresses may be stored as described above, and the confirmation bit may be set. If, during a subsequent execution of the load instruction and the store instruction, a determination is made that the load effective address does not match the store effective address, the confirmation bit may be cleared, indicating that the load effective address and store effective address may not match during subsequent execution of the instructions. During subsequent scheduling, where the confirmation bit is cleared, then the load and store instruction may be scheduled for execution in a default manner (e.g., without regard to whether the load and the store instruction conflict). Later, if the confirmation bit is cleared and the load effective address does match the store effective address, a portion of the load and store effective addresses may be stored and the confirmation bit may be set again.

In some cases, multiple confirmation bits may be utilized which track the history of whether the load and store effective addresses conflict. For example, if two confirmation bits are utilized, then the bits may track whether there is no accurate prediction ("00"), a partially accurate prediction ("01"), an accurate prediction ("10") or a very accurate prediction ("11") that the load effective address will match the store effective address. Each time the load and store effective addresses match, the confirmation value may be incremented (until the value "11" is reached) and each time the load and store effective addresses do not match, the confirmation value may be decremented (until the value "00" is reached). In some cases, the load and the store instruction may be scheduled as described above only if the confirmation level is above a threshold (e.g., only if an accurate prediction or very accurate prediction is made). The threshold may include a consecutive number of load-store conflict occurrences, a value of the confirmation bits, and/or a percentage of load-store conflict occurrences (e.g., the load and store instruction conflict 80% of the time).

In some cases, to determine if a load instruction and a store instruction conflict, a portion of the load address and/or a portion of the store address may be retrieved during predecoding of the load instruction and/or the store instruction. Furthermore, in some cases, the portion of the store address and/or the portion of the load instruction may be generated from address information retrieved during predecoding of the load instruction and/or store instruction. For example, in one embodiment, a portion of the load address or store address may be retrieved from the register file 240 during predecoding. The portion retrieved from the register file 240 may be used for comparison to determine if the load instruction and the store instruction conflict. Also, in some cases, the portion retrieved from the register file 240 may be added to an offset for the corresponding load instruction or store instruction and the address generated by the addition may be used for determination of whether a conflict exists. In some cases, retrieving such information may only be performed where a confirmation bit, described below, is cleared.

Storage of the Load-Store Conflict Information

As described above, in some cases, load-store conflict information and/or target addresses may be stored in an I-line containing the load instruction (e.g., by re-encoding the information in an instruction or by appending the data to the I-line). FIG. 11A is a block diagram depicting an exemplary I-line 1102 used to store Load-store conflict information and/or target addresses for a load instruction in the I-line 1102 according to one embodiment of the invention.

As depicted, the I-line may contain multiple instructions (Instruction 1, Instruction 2, etc.), bits used to store an address (for example, an effective address, EA), and bits used to store control information (CTL). In one embodiment of the invention, the control bits CTL depicted in FIG. 11A may be used to store load-store conflict information (e.g., the LSC, confirmation bits, and/or HIS bits) for a load instruction and the EA bits may be used to store load and/or store effective address portions.

As an example, as instructions in an I-line are executed, the processor core 114 may determine whether a load instruction within the I-line has caused a load-store conflict. If a load-store conflict is detected, the location of the load and/or instruction within the I-line may be stored in the CTL bits. For example, if each I-line contains 32 instructions, a five-bit binary number (containing enough bits to identify an instruction location) stored in the CTL bits may be used to identify the load and/or store instruction corresponding to the stored load-store conflict information and effective address information. LSC and/or HIS bits corresponding to the identified instruction(s) may also be stored in the CTL bits.

In one embodiment, the target address of data requested by the load instruction may be stored directly in (appended to) an I-line as depicted in FIG. 11A. The stored target address EA may be an effective address or a portion of an effective address (e.g., a high order 32 bits of the effective address). The target address EA may either identify the data requested by the load instruction or, optionally, a D-line containing the address of the targeted data. According to one embodiment, the I-line may store multiple addresses, with each address corresponding to a load instruction in the I-line.

In some cases, the EA and/or CTL bits may be stored in bits allocated for that purpose in the I-line. Optionally, in one embodiment of the invention, effective address bits EA and control bits CTL described herein may be stored in otherwise unused bits of the I-line. For example, each information line in the L2 cache 112 may have extra data bits which may be used for error correction of data transferred between different cache levels (e.g., an error correction code, ECC, used to ensure that transferred data is not corrupted and to repair any corruption which does occur). In some cases, each level of cache (e.g., the L2 cache 112 and the I-cache 222) may contain an identical copy of each I-line. Where each level of cache contains a copy of a given I-line, an ECC may not be utilized. Instead, for example, a parity bit may used to determine if an I-line was properly transferred between caches. If the parity bit indicates that an I-line is improperly transferred between caches, the I-line may be refetched from the transferring cache (because the transferring cache is inclusive of the line) instead of performing error checking.

As an example of storing addresses and control information in otherwise unused bits of an I-line, consider an error correction protocol which uses eleven bits for error correction for every two words stored. In an I-line, one of the eleven bits may be used to store a parity bit for every two instructions (where one instruction is stored per word). The remaining five bits per instruction may be used to store control bits for each instruction and/or address bits. For example, four of the five bits may be used to store load-store conflict information (such as LSC and/or HIS bits) for the instruction. If the I-line includes 32 instructions, the remaining 32 bits (one bit for each instruction) may be used to store other data, such as a load and/or store effective address portions. In one embodiment of the invention, an I-line may contain multiple load and store instructions, and load-store conflict information may be stored for each of the load and/or store instructions which result in a conflict.

In some cases, load-store conflict information may be stored in the load and/or store instructions after the instructions are decoded and/or executed (referred to a re-encoding).

FIG. 11B is a block diagram depicting an exemplary re-encoded store instruction 1104 according to one embodiment of the instruction. The load instruction 1104 may contain an Operation Code (Op-Code) used to identify the type of instruction, one or more register operands (Reg. 1, Reg. 1), and/or data. As depicted, the load instruction 604 may also contain bits used to store LSC, HIS, STAX and/or confirmation (CONF) bits.

When the store instruction is executed, a determination may be made of whether the store instruction results in a load-store conflict. As a result of the determination, the LSC, HIS, STAX, and/or CONF bits may be modified as described above. The LSC and/or HIS bits may then be encoded into the instruction, such that when the instruction is subsequently decoded, the LSC and/or HIS bits may be examined, for example, by the predecoder and scheduler 220. The predecoder and scheduler may then schedule the load and store instruction for execution as appropriate. In some cases, when a load or store instruction is re-encoded, the I-line containing that instruction may be marked as changed. Where an I-line is marked as changed, the I-line containing the re-encoded instruction may be written back to the I-cache 222. In some cases, as described above, the I-line containing the modified instruction may be maintained in each level of cache memory. Also, other bits of the instruction may also be used for re-encoding.

In one embodiment of the invention, where load-store conflict information is stored in I-lines, each level of cache and/or memory used in the system 100 may contain a copy of the information contained in the I-lines. In another embodiment of the invention, only specified levels of cache and/or memory may contain the information contained in the instructions and/or I-line. Cache coherency principles, known to those skilled in the art, may be used to update copies of the I-line in each level of cache and/or memory.

It is noted that in traditional systems which utilize instruction caches, instructions are typically not modified by the processor 110 (e.g., instructions are read-only). Thus, in traditional systems, I-lines are typically aged out of the I-cache 222 after some time instead of being written back to the L2 cache 112. However, as described herein, in some embodiments, modified I-lines and/or instructions may be written back to the L2 cache 112, thereby allowing the load-store conflict information to be maintained at higher cache and/or memory levels.

As an example, when instructions in an I-line have been processed by the processor core (possible causing the target address and/or Load-store conflict information to be updated), the I-line may be written into the I-cache 222 (e.g., using write back circuitry 238), possibly overwriting an older version of the I-line stored in the I-cache 222. In one embodiment, the I-line may only be placed in the I-cache 222 where changes have been made to information stored in the I-line.

According to one embodiment of the invention, when a modified I-line is written back into the I-cache 222, the I-line may be marked as changed. Where an I-line is written back to the I-cache 222 and marked as changed, the I-line may remain in the I-cache for differing amounts of time. For example, if the I-line is being used frequently by the processor core 114, the I-line may fetched and returned to the I-cache 222 several times, possibly be updated each time. If, however, the I-line is not frequently used (referred to as aging), the I-line may be purged from the I-cache 222. When the I-line is purged from the I-cache 222, the I-line may be written back into the L2 cache 112.

In one embodiment, the I-line may only be written back to the L2 cache where the I-line is marked as being modified. In another embodiment, the I-line may always be written back to the L2 cache 112. In one embodiment, the I-line may optionally be written back to several cache levels at once (e.g., to the L2 cache 112 and the I-cache 222) or to a level other than the I-cache 222 (e.g., directly to the L2 cache 112).

In some cases, a write-back path may be provided for writing modified instructions and/or I-line flags from the processor core 114 back to the I-cache 222. Because instructions are typically read-only (e.g., because instructions are typically not modified after the original program is executed), additional circuitry for writing instruction information from the I-cache 222 or processor core 114 back to the L2 Cache 112 may also be provided. In one embodiment, an additional write-back path (e.g., bus) from the I-cache 222 to the L2 cache 112 may be provided.

Optionally, in some cases, where a store-through from the D-cache 224 to the L2 cache 112 is utilized such that data written back to the D-cache 224 is automatically written back to the L2 cache 112 as well (allowing both caches to contain identical copies of the data), a separate path from the D-cache 224 to the L2 cache 112 may be provided for performing the store-through. In one embodiment of the invention, the store-through path may also be utilized for writing instructions and/or I-line flags back from the I-cache 222 to the L2 cache 112, thereby allowing the D-cache 224 and I-cache 222 to share the bandwidth of the store-through path.

Figure 12:
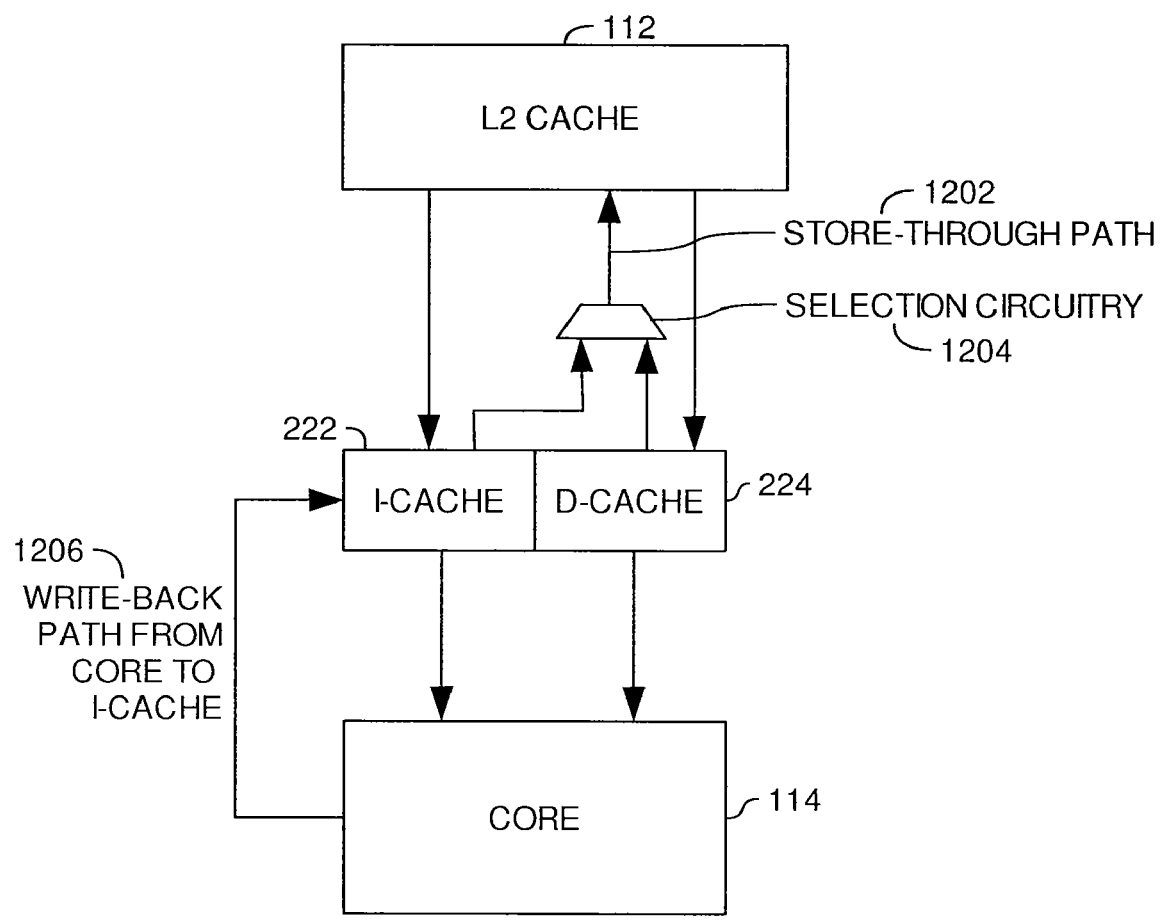
FIG. 12 is a block diagram depicting circuitry for writing load-store conflict information back from a processor core to cache memory according to one embodiment of the invention.

For example, as depicted in FIG. 12, selection circuitry 1204 may be inserted into the store-through path 1202. After load-store conflict information has been written back from the processor core 114 to the I-cache 222 via the write-back path 1206, the load-store conflict information may remain in the I-cache 222 until the I-line containing the information is aged out or otherwise discarded from the I-cache 222. When the I-line is discarded form the I-cache 222, the load-store conflict information (e.g., the flags appended to the end of the I-line and/or the flags re-encoded into instructions) may be selected by the selection circuitry 1204 and written back via the store-through path 1202, thereby successfully maintaining the load-store conflict information in the L2 cache 112. Optionally, instead of writing the load-store conflict information when the I-line containing the information is discarded from the I-cache 222, the load-store conflict information may be automatically written back when the information is received from the core 114, for example, via the write-back path 1206. In any case, the write-back from the I-cache 222 to the L2 cache 112 may occur during dead-cycles, for example, when the store-through path 1202 is not otherwise being utilized.

In one embodiment, bits in each instruction may be re-encoded after the instruction has been executed, as described. In some cases, the load-store conflict information may also be encoded in the instruction when the instruction is compiled from higher level source code. For example, in one embodiment, the compiler may be designed to recognize load and store instructions which may result in a load-store conflict and set bits in the instructions accordingly.

Optionally, once the source code of a program has been created, the source code may be compiled into instructions and the instructions may then be executed during a test execution. The test execution and the results of the test execution may be monitored to determine which instructions result in a load-store conflict. The source code may then be recompiled such that the load-store conflict information is set to appropriate values in light of the test execution. In some cases, the test execution may be performed on the processor 110. In some cases, control bits or control pins in the processor 110 may be used to place the processor 110 in a special test mode for the test execution. Optionally, a special processor, designed to perform the test execution and monitor the results may be utilized.

Shadow Cache:

As described above, load-store conflict information may be stored in a special cache. The address of a load or store instruction (or, optionally, the address of an I-line containing the instruction(s)) may be used as an index into the special cache. The special cache may be referred to as a shadow cache.

In one embodiment, when an I-line containing a load or store instruction is received (e.g., by the predecoder and scheduler 220), the shadow cache may be searched (e.g., the shadow cache may be content addressable) for an entry (or entries) corresponding to the fetched I-line (e.g., an entry with the same effective address as the fetched I-line). If a corresponding entry is found, the load-store conflict history information and/or target address(es) associated with the entry may be used by the predecoder and scheduler 220 or other circuitry to schedule any load or store instructions which may conflict, if necessary.

In one embodiment of the invention, the shadow cache may both store control bits (e.g., load-store conflict information) and load/store effective address portions as described above. Optionally, the control bits may be stored in the I-line and/or in individual instructions while other information is stored in the shadow cache.

In addition to using the techniques described above to determine which entries to store in the shadow cache, in one embodiment, traditional cache management techniques may be used to manage the shadow cache, either exclusively or including the techniques described above. For example, entries in the shadow cache may have age bits which indicate the frequency with which entries in the shadow cache are accessed. If a given entry is frequently accessed, the age value may remain small (e.g., young). If, however, the entry is infrequently accessed, the age value may increase, and the entry may in some cases be discarded from the shadow cache.

Further Exemplary Embodiments

In one embodiment of the invention, the effective address portions and other load-store conflict information may be continuously tracked and updated at runtime such that the load-store conflict information and other stored values may change over time as a given set of instructions is executed. Thus, the load-store conflict information may be dynamically modified, for example, as a program is executed.

In another embodiment of the invention, load-store conflict information may be stored during an initial execution phase of a set of instructions (e.g., during an initial "training" period in which a program is executed). The initial execution phase may also be referred to as an initialization phase or a training phase. During the training phase, load-store conflict information may be tracked and stored (e.g., in the I-line containing the instruction or in a special cache) according to the criteria described above. When the training phase is completed, the stored information may continue to be used to schedule execution of instructions as described above.

In one embodiment, one or more bits (stored, for example, in the I-line containing the load instruction or in a special cache or register) may be used to indicate whether an instruction is being executed in a training phase or whether the processor 110 is in a training phase mode. For example, a mode bit in the processor 110 may be cleared during the training phase. While the bit is cleared, the load-store conflict information may be tracked and updated as described above. When the training phase is completed, the bit may be set. When the bit is set, the load-store conflict information may no longer be updated and the training phase may be complete.

In one embodiment, the training phase may continue for a specified period of time (e.g., until a number of clock cycles has elapsed, or until a given instruction has been executed a number of times). In one embodiment, the most recently stored load-store conflict information may remain stored when the specified period of time elapses and the training phase is exited. Also, in one embodiment, the training phase may continue until a given I-line has been executed a threshold number of times. For example, when the I-line is fetched from a given level of cache (e.g., from main memory 102, the L3 cache, or the L2 cache 112), a counter (e.g., a two or three bit counter) in the I-line may be reset to zero. While the counter is below a threshold number of I-line executions, the training phase may continue for instructions in the I-line. After each execution of the I-line, the counter may be incremented. After the threshold number of executions of the I-line, the training phase for instructions in the I-line may cease. Also, in some cases, different thresholds may be used depending upon the instructions in the I-line which are being executed (e.g., more training may be used for instructions which have outcomes varying to a greater degree).

In another embodiment of the invention, the training phase may continue until one or more exit criteria are satisfied. For example, where load-store conflict histories are stored, the initial execution phase may continue until a load-store conflict becomes predictable (or strongly predictable). When the outcome becomes predictable, a lock bit may be set in the I-line indicating that the initial training phase is complete and that the load-store conflict information may be used for subsequent scheduling and execution.

In another embodiment of the invention, the target addresses and cache miss information may be modified in intermittent training phases. For example, a frequency and duration value for each training phase may be stored. Each time a number of clock cycles corresponding to the frequency has elapsed, a training phase may be initiated and may continue for the specified duration value. In another embodiment, each time a number of clock cycles corresponding to the frequency has elapsed, the training phase may be initiated and continue until specified threshold conditions are satisfied (for example, until a specified level of load-store conflict predictability is reached, as described above).

In some cases, where the LSC bit has been set and predicts a load-store conflict, the prediction may become unreliable, e.g., executing the load and store instructions may not result in a load-store conflict. In such circumstances, the LSC bit may be later cleared if repeated executions of the instruction do not result in load-store conflict. For example, a counter may record the number of previous times in which the load instruction has not resulted in a load-store conflict. Each time the instruction results in a load-store conflict, the counter may be reset to 0. Each time the instruction does not result in a load-store conflict, the counter may be incremented. When the counter reaches a given threshold (e.g., 4 sequential non-misses), the prediction bit may be cleared. Optionally, instead of resetting the counter each time the instruction results in a miss, the counter may be decremented. By providing a mechanism for clearing the LSC prediction bit, the processor may avoid unnecessarily scheduling load and store instructions as described above. Furthermore, where the prediction bit is cleared, another bit or bits may be set to indicate that whether the instruction results in a load-store conflict is unpredictable.

In one embodiment of the invention, where either a load instruction or a store instruction which are dependent on each other results in a cache miss, a load-store conflict may not occur. For example, the cache miss may indicate that the data being accessed by the load and store instruction is not located in the D-cache 224. When the data is fetched and placed in the D-cache 224, the data from the store instruction may be used to update the fetched data before providing the data for the load instruction. Thus, the load instruction may receive correctly updated data without a load-store conflict. Accordingly, where either a load instruction or a store instruction results in a cache miss, load-store conflict information may not be recorded.

While embodiments of the invention are described above with respect to a processor utilizing a cascaded, delayed execution pipeline unit, and with respect to a processor having multiple cores 114, embodiments of the invention may be utilized with any processor, including conventional processors which may not utilize cascaded, delayed execution pipeline units or multiple cores. Alternate, suitable configurations should be readily apparent to those of ordinary skill in the art.

While the foregoing is directed to embodiments of the present invention, other and further embodiments of the invention may be devised without departing from the basic scope thereof, and the scope thereof is determined by the claims that follow.

What is claimed is:

1. A processor, comprising:
   a cache; and
   circuitry configured to:
   receive a load instruction and a store instruction from the cache;
   determine if load-store conflict information encoded in both the load instruction and the store instruction indicates that the load instruction previously conflicted with the store instruction, wherein the load-store conflict information includes a conflict bit and history bits, and wherein detecting a conflict comprises:
   1) determining if a page number encoded in the load instruction matches a page number encoded in the store instruction, wherein each page number has an associated page number validity bit that indicates if a respective page number is valid, wherein the page number of the load instruction and the page number of the store instruction are compared only if the page number validity bit is set for both the load instruction and the store instruction, wherein the page number represents which page of a cache an effective address references;
   2) determining if a portion of a load effective address encoded in the load instruction matches a portion of a store effective address encoded in the store instruction upon detection of a match between the page number of the store instruction and the page number of the load instruction; and
   3) setting the conflict bit and subsequently encoding the conflict bit in the load instruction and the store instruction upon detection of a match between the portion of a load effective address and the portion of the store effective address;
   schedule execution of the load instruction and the store instruction so that execution of the load instruction and the store instruction do not result in a conflict only if the load-store conflict information is set for both the load instruction and the store instruction and the value stored in a plurality of history bits are above a threshold level;
   execute the load instruction and the store instruction; and
   change the history bits, wherein the history bits are decremented if the load effective address does not match the store effective address and incremented if the load effective address and the store effective address match, wherein the history bits are indicative of a prediction level, wherein a higher value of the prediction level represents a greater chance of detecting a conflict between the load instruction and the store instruction during subsequent execution of the load instruction and the store instruction.

2. A processor, comprising:
a cache; and
circuitry configured to:
  receive a load instruction and a store instruction from the cache;
  determine if load-store conflict information encoded in both the load instruction and the store instruction indicates that the load instruction previously conflicted with the store instruction, wherein the load-store conflict information includes a conflict bit and history bits, and wherein detecting a conflict comprises:
    1) determining if a page number encoded in the load instruction matches a page number encoded in the store instruction, wherein each page number has an associated page number validity bit that indicates if a respective page number is valid, wherein the page number of the load instruction and the page number of the store instruction are compared only if the page number validity bit is set for both the load instruction and the store instruction, wherein the page number represents which page of a cache an effective address references;
    2) determining if a portion of a load effective address encoded in the load instruction matches a portion of a store effective address encoded in the store instruction upon detection of a match between the page number of the store instruction and the page number of the load instruction; and
    3) setting the conflict bit and subsequently encoding the conflict bit in the load instruction and the store instruction upon detection of a match between the portion of a load effective address and the portion of the store effective address;
  schedule execution of the load instruction and the store instruction so that execution of the load instruction and the store instruction do not result in a conflict only if the load-store conflict information is set for both the load instruction and the store instruction and the value stored in a plurality of history bits are above a threshold level, wherein scheduling the load instruction and the store instruction comprises scheduling the load instruction and the store instruction to be executed in a same pipeline execution unit;
  execute the load instruction and the store instruction; and
  change the history bits, wherein the history bits are decremented if the load effective address does not match the store effective address and incremented if the load effective address and the store effective address match, wherein the history bits are indicative of a prediction level, wherein a higher value of the prediction level represents a greater chance of detecting a conflict between the load instruction and the store instruction during subsequent execution of the load instruction and the store instruction.

3. The processor of claim 2, wherein results of the store instruction are forwarded to the same pipeline execution unit and merged with data for the load instruction.

4. The processor of claim 2, wherein the same pipeline execution unit is one of a plurality of pipeline execution units in a processor core, and wherein the same pipeline execution unit is an only pipeline execution unit of the plurality of pipeline execution units in which load instructions and store instructions are executed.

5. A processor, comprising:
a cache; and
circuitry configured to:
  receive a load instruction and a store instruction from the cache;
  determine if load-store conflict information encoded in both the load instruction and the store instruction indicates that the load instruction previously conflicted with the store instruction, wherein the load-store conflict information includes a conflict bit and history bits, and wherein detecting a conflict comprises:
    1) determining if a page number encoded in the load instruction matches a page number encoded in the store instruction, wherein each page number has an associated page number validity bit that indicates if a respective page number is valid, wherein the page number of the load instruction and the page number of the store instruction are compared only if the page number validity bit is set for both the load instruction and the store instruction, wherein the page number represents which page of a cache an effective address references;
    2) determining if a portion of a load effective address encoded in the load instruction matches a portion of a store effective address encoded in the store instruction upon detection of a match between the page number of the store instruction and the page number of the load instruction; and
    3) setting the conflict bit and subsequently encoding the conflict bit in the load instruction and the store instruction upon detection of a match between the portion of a load effective address and the portion of the store effective address;
  schedule execution of the load instruction and the store instruction so that execution of the load instruction and the store instruction do not result in a conflict only if the load-store conflict information is set for both the load instruction and the store instruction and the value stored in a plurality of history bits are above a threshold level, wherein scheduling the load instruction and the store instruction comprises scheduling the load instruction and the store instruction to be executed in a first pipeline execution unit and scheduling the store instruction to be executed in a second pipeline execution unit;
  execute the load instruction and the store instruction; and
  change the history bits, wherein the history bits are decremented if the load effective address does not match the store effective address and incremented if the load effective address and the store effective address match, wherein the history bits are indicative of a prediction level, wherein a higher value of the prediction level represents a greater chance of detecting a conflict between the load instruction and the store instruction during subsequent execution of the load instruction and the store instruction.

6. The processor of claim 5, wherein results of the store instruction are forwarded from the second pipeline execution unit to the first pipeline execution unit and merged with data for the load instruction in the first pipeline.

* * * * *